US012188276B2

(12) United States Patent
Shin et al.

(10) Patent No.: US 12,188,276 B2
(45) **Date of Patent: *Jan. 7, 2025**

(54) LATCH MODULE AND AN APPLIANCE USING THE SAME

(71) Applicant: LG ELECTRONICS INC., Seoul (KR)

(72) Inventors: Myeong Jun Shin, Seoul (KR); Jeongkil Kim, Seoul (KR); Jangmo Shin, Seoul (KR); Seongho Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,660

(22) Filed: Jul. 28, 2023

(65) Prior Publication Data

US 2023/0366252 A1 Nov. 16, 2023

Related U.S. Application Data

(60) Continuation of application No. 17/580,347, filed on Jan. 20, 2022, now Pat. No. 11,753,856, which is a (Continued)

(30) Foreign Application Priority Data

Apr. 16, 2018 (KR) ........................ 10-2018-0044151

(51) Int. Cl.
*E05F 1/00* (2006.01)
*E05B 15/04* (2006.01)
(Continued)

(52) U.S. Cl.
CPC .............. *E05F 1/043* (2013.01); *E05B 15/04* (2013.01); *E05F 15/70* (2015.01); (Continued)

(58) Field of Classification Search
CPC ... E05F 15/70; E05F 5/02; E05F 1/043; E05F 3/14; E05F 1/1261; E05F 1/1041; (Continued)

(56) References Cited

U.S. PATENT DOCUMENTS 5,220,153 A 6/1993 Malone ................. F24C 15/022 219/412
5,341,542 A 8/1994 Hannan ................. E05F 1/1276 16/375
(Continued)

FOREIGN PATENT DOCUMENTS

CN 206091628 U 4/2017
CN 206342325 U 7/2017
(Continued)

OTHER PUBLICATIONS

Office Action of Chinese Patent Office in Appl'n No. 201980026380.7, dated May 17, 2021.

*Primary Examiner* — Chi Q Nguyen
(74) *Attorney, Agent, or Firm* — Bryan Cave Leighton Paisner LLP

(57) ABSTRACT

A latch module for controlling an opening and a closing of a door of an appliance includes a latch, a spring that applies an elastic force to the latch, a motor; and a cam that contacts a contact surface of the latch and is coupled to the motor to drive the cam to pivot the latch. The cam includes a first radius, a second radius, and a third radius in a circumferential direction at an outer circumference of the cam. The latch is positioned at a first basic position when the first radius of the cam contacts the contact surface of the latch, positioned at a second basic position when the second radius of the cam contacts the contact surface of the latch, and positioned at a third basic position when the third radius of the cam contacts the contact surface of the latch.

20 Claims, 19 Drawing Sheets

Related U.S. Application Data division of application No. 16/384,780, filed on Apr. 15, 2019, now Pat. No. 11,261,634.

(51) Int. Cl.
*E05F 1/04* (2006.01)
*E05F 15/70* (2015.01)

(52) U.S. Cl.
CPC ..... *E05Y 2201/638* (2013.01); *E05Y 2400/30* (2013.01); *E05Y 2900/30* (2013.01)

(58) Field of Classification Search
CPC ....... E05F 1/1276; E05F 1/292; E05F 1/1246; E05B 15/04; E05B 17/0029; F24C 15/022; F24C 15/023; E05Y 2201/266; E05Y 2201/722; E05Y 2900/308; E05Y 2201/21; E05Y 2400/30; E05Y 2900/30; E05Y 2201/264; E05Y 2201/254; E05Y 2600/53; Y10T 292/1082
See application file for complete search history.

(56) References Cited

U.S. PATENT DOCUMENTS

| | | | | |
|---|---|---|---|---|
| 5,577,583 | A | 11/1996 | O'Donnell | E05B 81/06 192/71 |
| 7,066,503 | B2 | 6/2006 | Smith | F24C 15/022 126/197 |
| 7,156,428 | B2 | 1/2007 | Smith | E05B 17/0029 292/109 |
| 7,334,823 | B2 | 2/2008 | Courter | E05B 17/0029 126/197 |
| 7,726,294 | B2 | 6/2010 | Collene | F24C 15/022 126/197 |
| 8,430,089 | B2 | 4/2013 | Kim et al. | |
| 9,958,167 | B2 | 5/2018 | Lomicka | E05B 53/00 |
| 10,041,685 | B2 | 8/2018 | Kim | F24C 15/023 |
| 10,961,755 | B2 | 3/2021 | Oh | E05F 1/1276 |
| 11,085,648 | B2 | 8/2021 | DeYoung | F24C 15/022 |
| 11,261,634 | B2 | 3/2022 | Shin | E05B 47/023 |
| 11,753,856 | B2 * | 9/2023 | Shin | F24C 15/022 49/400 |
| 2006/0001273 | A1 | 1/2006 | Smith | F24C 15/022 292/204 |
| 2006/0090742 | A1 | 5/2006 | Priest | F24C 15/022 126/192 |
| 2006/0201928 | A1 | 9/2006 | Smith et al. | |
| 2006/0213898 | A1 | 9/2006 | Beaudoin | |
| 2006/0232077 | A1 | 10/2006 | Courter et al. | |
| 2007/0090655 | A1 | 4/2007 | Smith | E05B 17/0029 292/201 |
| 2007/0101542 | A1 | 5/2007 | Lee | E05F 1/1276 16/286 |
| 2008/0271727 | A1 | 11/2008 | Collene et al. | |
| 2008/0289144 | A1 | 11/2008 | Vanini | F24C 15/023 16/221 |
| 2009/0139286 | A1 | 6/2009 | Kishimoto | F24C 15/022 70/277 |
| 2010/0127606 | A1 | 5/2010 | Collene | E05F 1/1292 312/327 |
| 2012/0067333 | A1 | 3/2012 | Mirshekari | E05F 3/14 126/192 |
| 2015/0068509 | A1 | 3/2015 | Gayle et al. | |
| 2016/0348919 | A1 | 12/2016 | Ivanovic et al. | |
| 2016/0381740 | A1 | 12/2016 | D'Andrea et al. | |
| 2018/0058108 | A1 * | 3/2018 | Tametani | E05C 3/145 |
| 2019/0301203 | A1 | 10/2019 | Shin | E05C 19/12 |
| 2019/0353353 | A1 * | 11/2019 | White | F24C 15/023 |
| 2020/0102772 | A1 * | 4/2020 | Ishiguro | E05B 79/04 |
| 2020/0115932 | A1 * | 4/2020 | Ottino | E05B 81/01 |
| 2020/0284440 | A1 | 9/2020 | DeYoung | F24C 15/023 |
| 2020/0378152 | A1 * | 12/2020 | Zhang | E05C 3/24 |
| 2021/0010190 | A1 | 1/2021 | Ahamad | D06F 39/14 |
| 2021/0102414 | A1 * | 4/2021 | Meziere | E05B 83/24 |
| 2021/0198835 | A1 | 7/2021 | Jeffery | B25B 11/02 |
| 2021/0388556 | A1 | 12/2021 | Ahamad | E05D 3/02 |
| 2022/0112744 | A1 * | 4/2022 | Wheatland | E05C 1/004 |
| 2022/0205295 | A1 * | 6/2022 | Gore | E05D 7/10 |
| 2023/0076331 | A1 * | 3/2023 | Bleyer | H04N 5/272 |

FOREIGN PATENT DOCUMENTS

| | | | |
|---|---|---|---|
| EP | 2927603 | A1 | 10/2015 |
| EP | 3557137 | A1 | 10/2019 |
| EP | 3557139 | A1 | 10/2019 |
| KR | 1020050081374 | A | 8/2005 |
| KR | 1020090103293 | A | 10/2009 |
| WO | 2015150050 | A1 | 10/2015 |
| WO | 2019203444 | A1 | 10/2019 |

* cited by examiner

LATCH MODULE AND AN APPLIANCE USING THE SAME

CROSS-REFERENCE TO RELATED APPLICATION

This application is a contination of U.S. patent application Ser. No. 17/580,347, filed Jan. 20, 2022, which is a Divisional Application of U.S. patent application Ser. No. 16/384,780, filed Apr. 15, 2019 (now U.S. patent Ser. No. 11/261,634, issued on Mar. 1, 2022), which claims the benefit of Korean Patent Application No. 10-2018-0044151, filed on Apr. 16, 2018, the contents of which are all hereby incorporated by reference herein in their entirety.

BACKGROUND

Field of the Disclosure

The present disclosure relates to a latch module having an automatic opening function and a secure lock function incorporated therewith, a method of controlling such latch module, and a cooking device applying such latch module.

Background

A cooking device such as an oven or a microwave oven includes a rectangular parallelepiped appearance. The cooking device includes an inner cooking chamber having an open front thereof, and a door in front of the cooking chamber.

The door may be opened in various ways. For example, a hinge-connected door connected by a hinge method rotates about a rotational shaft. The hinge type door may have a handle or groove that the user may grip.

A cooking device may have an automatic opening function of a door thereof to improve the quality of use. Of course, even if the automatic opening function of the door is applied, for convenience of the user, the door may be designed to be manually opened or closed.

Further, a self-cleaning function is added to the cooking device so that the cooking chamber is easily cleaned. The self-cleaning function enables heating the inside of the cooking chamber to a high temperature so that food attached to an inner wall of the cooking chamber is burned, or treating the food attached to the inner wall of the cooking chamber with high-temperature steam, so that the food is softened and conveniently removed during cleaning. In order to prevent a safety accident, the door of the cooking device may be securely closed during a self-cleaning operation.

U.S. Pat. No. 7,726,294 and US Patent Publication No. 2007/0296224 disclose an operating structure of a hook for maintaining a door in a securely closed state during the self-cleaning operation. By rotating a drive such as a motor and the like, and applying a link structure, when the door needs to be maintained in a securely closed state, the hook is operated by the drive so that the hook is engaged with the door, and when the door no longer needs to be maintained in the securely closed state, the hook is operated again by the drive so that the hook is released from the door.

With the operating structure of a hook described above, after the hook is released from the door, a door lock device enables closing the door and does not enable automatically opening the door. That is, the door lock device has no means for automatically opening the door.

A secure (secure lock, self-cleaning lock) device that serves to securely lock the door during the self-cleaning operation and an automatic opening (auto door open) device that serves to automatically open the door may be applied individually. That is, U.S. Pat. No. 7,726,294 and US Patent Publication No. 2007/0296224 provide a drive (a motor) that provides power and a power transmission structure to securely lock the door, and another drive (another motor) that provides power and another power transmission structure to automatically open the door.

SUMMARY

It is not easy to incorporate a secure lock function of a door for self-cleaning with a separate automatic opening function of the door when a manual opening and closing function of the door needs to be implemented as well.

However, when new functions are added, the modules for implementing the functions are added individually, thereby increasing the number of components and production costs, as well as increasing the occupied volume in the cooking device, thereby decreasing the volume of the cooking chamber.

It is desirable to have a module incorporated with various functions. However, in situations described above, when the module is incorporated with a safety function for preventing accidents, the function for preventing the accidents needs to be robust and reliable.

Accordingly, a door control module capable of incorporating all functions as well as minimizing the number of parts, and having a safety function for preventing an accident is highly desirable.

On the other hand, when the door control module is incorporated with various functions, the drive control also becomes complicated, and more switches for controlling the parts that drive the door control module may need to be installed. However, an increase in the number of installed switches not only increases an occupied volume in the door control module, but also raises production costs.

Further, when the functions are incorporated, initializing the door control module is required when the cooking device is initially supplied with power. However, if the door control module does not have a proper initialization structure and operated, for example, the door may accidentally open automatically during initialization of the door control module, and the user may think that the cooking device is operating incorrectly or the cooking device has failed. Therefore, the door control module should not automatically open the door when the door control module is initialized.

The present disclosure solves the above-mentioned problems. The present disclosure provides a latch module that implements a manual lock function of a door and a secure lock function of a door for self-cleaning operation of a cooking chamber with one latch and a cooking device applying such latch module.

The present disclosure further provides a latch module that implements a manually opening and closing function of a door and an automatic opening function of a door and a secure lock function of a door by operating with one latch and a cooking device applying such latch module.

The present disclosure also provides a latch module that implements a manually opening and closing function of a door and an automatic opening function of a door and a secure lock function of the door by operating with one latch with one drive source and one power transmission structure, and a cooking device applying such latch module.

The present disclosure also provides a latch module that implements a secure lock and unlock function of a door by means of a kinematic interference between the two components while one latch implements the two functions and a cooking device applying such latch module.

The present disclosure also provides a structure capable of accurately controlling a latch module while minimizing the number of switches to be installed, a method of controlling such latch module, and a cooking device applying such latch module.

The present disclosure also provides a structure of a latch module in which a user may not mistakenly consider the operation of the cooking device as malfunctioning or failure at the beginning of the driving of the cooking device and a method of controlling such latch module.

The present disclosure may be applied to an appliance such as a cooking device including a main body having a cooking chamber (a cavity), a door that opens and closes an open front of the cooking chamber, and an opening or closing rotational shaft as a center of rotation of opening and closing a movement of the door.

The opening and closing rotational shaft rotatably connects the door with respect to the main body about a horizontal rotational shaft extending in a left-right direction and disposed at a front lower portion of the main body. Accordingly, the door may have a pull-down structure in which the door is rotated forward about the rotational shaft and descends and is opened.

The door may be connected to the main body via a hinge module including the opening and closing rotational shaft. The hinge module may apply an elastic force so as to move the door in an opening direction in a range of initial opening angle and may apply an elastic force the door in a closing direction thereof in a range in which an opening angle of the door exceeds the initial opening angle.

The door may be opened by its own weight at the initial opening angle. A damper starts to damp an opening speed of the door at a damping beginning angle greater than the initial opening angle. The opening speed is controlled until the door is opened to a completely opened angle so that the door is opened slowly.

The cooking device may have a self-cleaning function of raising a temperature inside of the cooking chamber to a high temperature. Accordingly, the door is prevented from being opened in advance when the door is securely locked to perform the self-cleaning function.

The cooking device may further apply a structure that automatically opens the door by means of command input by a user. Generally, the door also may be manually opened and closed.

According to the present disclosure, all of these functions are implemented by one latch module. The latch module may be installed on the main body and a rear upper portion of the door may have a pin which is an engaged structure that is engaged with or released from a latch of the latch module. The position at which the latch may move may include a first basic position, a second basic position, and a third basic position.

Each of the first basic position and the third basic position may be a position in which the latch is engaged with the engaging structure so as to maintain a state in which the door is closed.

The second basic position may be a position in which the latch is not engaged with the engaging structure.

The first basic position may be a position in which, when an external force is applied to the door in a direction of opening the door, the latch is released from the engaging structure so that the door is opened, while the third basic position may be a position in which, even if the external force is applied to the door in a direction of opening the door, a state in which the latch is engaged with the engaging structure is maintained.

The latch may be moved to at least one position of the three positions by the controller. In other words, the controller may control the position of the latch.

The hinge module may apply a force in a direction of opening the door at a position in which the door is closed. Thus, when the latch is in the second basic position, the door may be opened by the force of the hinge module.

In order to solve the above-described problems, according to the present disclosure, the latch module may include a bracket as a base of the latch module; a latch installed in the bracket rotatable about a pivot shaft and having a hook engaged with the pin, an elastic body that moves the latch to rotate in a first direction; a drive that provides a power for rotating the latch in a second direction which is an opposite to the first direction using a force greater than an elastic force of the elastic body; and a power transmission that transmits the power of the drive to the latch.

The hook is opened toward the first direction, and an engaging surface that is engaged with the pin is provided inside of the hook. An inclined insertion surface may be provided on a surface opposed to the engaging surface of the hook.

The engaging surface includes a disengaged inclined surface arranged closer to the first direction and a secure lock surface arranged closer to the second direction. The two surfaces are connected to each other via a soft curved surface so that a sliding of a pin about the two surfaces is smooth.

Depending on a rotation position of the latch, the portions of the engaging surface in contact with the pin are varied. The pin contacts the disengaged inclined surface or contacts the secure lock surface depending on the rotation position of the latch.

In a general state, that is, in a manual lock state where the user may manually open and close the door, a rear surface of the pin of the door contacts the disengaged inclined surface when the door is closed. In order to allow the user to manually open the door, when the latch is rotated so as to be in a state in which the disengaged inclined surface contacts the pin, the disengaged inclined surface has a surface inclined in the opening direction of the door toward the first direction. When the user pulls the door in an opening direction thereof, the latch may rotate in the second direction by using a force in which the pin pushes the disengaged inclined surface, which is greater than the elastic force, and thereby the door may be manually opened.

When the user closes the door in a state where the door is opened, the surface of the pin of the door contacts the inclined insertion surface. In order for the user to manually close the door, when the latch rotates so as to be in the state in which the inclined insertion surface contacts the pin, the inclined insertion surface has a surface inclined in the closing direction of the door toward the first direction.

The inclined insertion surface may be provided not only in a position range opposed to the disengaged inclined surface but also in a position range opposed to the secure lock surface. It is possible to close the opened door regardless of whether the latch is in any position (the manual lock position and the secure lock position).

In a general state, the elastic body is involved in the operation of the latch for a manual opening and closing operation.

In a completely locked state where the user does not manually open the door for self-cleaning and the like, that is, in the secure lock state, the pin of the door contacts the secure lock surface. The latch is further rotated in the first direction than in the manual lock state and the pin of the door is relatively positioned deeply inward the hook (actually, the pin remains its position and the hook is further rotated).

In order for the hook to completely securely lock the door, the secure lock surface may have a surface inclined in the closing direction of the door toward the first direction. Then, when the user pulls the door, a force applied by the pin of the door to the hook further rotates the hook in the first direction. That is, the more the user opens the door, the deeper the pin is positioned deeply inward the hook. In other words, the more the user opens the door, the more the hook securely locks the pin.

Similar result is obtained if the secure look surface has a surface perpendicular to the opening direction of the door. That is, even if the user opens the door, such force does not lead to the rotation of the latch.

An elasticity of the elastic body contributes to rotate the latch from a manual lock position to a secure lock position.

As described above, according to the present disclosure, the engaging surface of the hook of the latch for opening and closing the door has a portion capable of manually opening and closing the door and a complete secure lock portion. It is possible to determine which one of the two portions contacts the pin of the door depending on a rotation displacement of the latch so that both the manual lock state and the secure lock state of the door may be implemented by one latch.

The automatic opening operation of the door and the secure lock operation of the door may be implemented with one latch, one drive and power transmission that drive the latch.

The power transmission is a cam in contact with a contact surface provided on the side of the latch. A center of rotation of the cam may be disposed in adjacent to a first direction, than a side of the latch to which the cam contacts. It is possible to determine a position of the latch by changing the radius of the cam that contacts the latch depending on the rotational displacement of the cam.

As the elastic body elastically supports the latch so as to rotate in the first direction and the center of rotation of the cam is disposed in adjacent to the first direction than the latch, a degree in which the latch may move in the first direction may be determined depending on the radius of the cam that contacts the latch. Of course, even in this state, the latch may move in the second direction by a force greater than the elastic force of the elastic body. When the force greater than the elastic force of the elastic body disappears, the latch is rotated and returned again by the elastic body to the position in contact with the cam in the first direction.

A combination of the elastic body that elastically forces the latch in the first direction and the cam disposed in adjacent to the first direction than the latch may simply enable a basic position of the latch to be adjusted by adjusting a radius of the cam in contact with the latch. Adjusting the basic positions of the latch may be a method of determining which one of the disengaged inclined surface and the secure lock surface in the engaged surface of the hook of the latch contacts the pin of the door.

The cam may include the radiuses having at least three different radiuses in a circumferential direction thereof at the outer circumference thereof. The first radius enables the latch to be in the first basic position and the second radius enables the latch to be in the second basic position, and the third radius enables the latch to be in the third basic position.

When the latch is moved in a second direction in the first basic position, the latch may reach the second basic position. When the latch is moved in a first direction in the first basic position, the latch may reach the third basic position.

The first radius as a reference enables a latch to be in a general basic position, that is, a position where the user may manually open and close the door (a manual lock position). The pin of the door contacts the disengaged inclined surface of the hook of the latch at a position where the first radius contacts the contact surface of the latch.

The second radius has a radius greater than the first radius. The second radius is connected to the first radius via a connecting surface having a smooth curved surface. Therefore, when the cam rotates in a first rotational direction such that a contact portion of the cam and the latch is moved from the first radius to the second radius, a basic position of the latch further moves in the second direction. When the second radius contacts the latch, the hook of the latch moves to the open position and may no longer be engaged with the pin of the door. That is, the pin is relatively away from the hook.

Accordingly, when the latch in contact with the first radius contacts the second radius as the cam rotates, the door is moved by the elastic force by the hinge module so that the door is opened to the initial opening angle and the door is completely opened by the weight of the door itself.

The third radius has a radius less than the first radius. The third radius is connected to the first radius via a connection surface having the smooth curved surface. Therefore, when the cam rotates in a second rotational direction (a direction opposite to the first rotational direction) so that the contact portion of the cam the latch is moved from the first radius to the third radius, the basic position of the latch is further moved in the first direction to move to the secure lock position. When the third radius contacts the latch, the hook is engaged with the pin of the door deeply inward. That is, the pin of the door contacts the secure lock surface of the hook of the latch.

According to the present disclosure, the operation of moving the latch from the first basic position to the third basic position may be made by the elastic body. However, if the latch is engaged with the first basic position due to an unexpected state, the elastic force applied by the elastic body in the first direction may not enable the latch to move from the first basic position to the third basic position.

According to the present disclosure, while the cam rotates from the first mode to the third mode, the surface of the cam and the latch are kinematically interfered with each other, and power of the drive is transmitted to the latch so as be applied in a direction of moving from the first basic position to the third basic position.

Further, due to the kinematic interference of the cam and the latch when the cam is in a third mode and the latch is also in the third basic position, the present disclosure provides a structure in which the latch is prevented from deviating from the third basic position toward the first basic position.

To this end, according to the present disclosure, the latch further provides an extension that may be kinematically interfered with the cam. The extension has an sub-contact surface that approaches the cam as the latch moves in the second direction and is away from the cam as the latch moves in the first direction. Meanwhile, the contact surface 55 approaches the cam 70 as the latch 50 moves in the first direction and is away from the cam 70 as the latch 50 moves in the second direction.

The cam 70 may transmit the power of the drive to the latch by the contact surface 55 so that the latch moves in the second direction. The cam 70 may transmit the power of the drive to the latch by the sub-contact surface 59 so that the latch moves in the first direction. The latch may be prevented from moving in the second direction in a state where the sub-contact surface is interfered with the cam 70.

In the first mode where the first radius of the cam contacts the contact surface of the latch so that the latch is in the first basic position (the manual lock state), the extension may not disturb the manual opening and closing rotation of the latch.

To this end, the cam surface that faces the sub-contact surface when the cam is in the first mode may have a radius so that a movement for the sub-contact surface to approach the cam surface is allowed even if the latch is moved from the first basic position to the second basic position.

In other words, a distance between a position of the sub-contact surface and a center of rotation of the cam while the cam is in the first mode and the latch is in the first basic position may be greater than a radius of the cam surface in contact with the sub-contact surface when the first radius of the cam contacts the contact surface of the latch. A distance between a position of the sub-contact surface and the center of rotation of the cam while the cam is in the first mode and the latch is in the second basic position may be equal to or greater than a radius of the cam surface that faces the sub-contact surface while the first radius of the cam contacts the contact surface of the latch.

In the first mode where the first radius of the cam contacts the contact surface of the latch, the cam surface that faces the sub-contact surface may be the first radius, the third radius or the connecting surface that connects the first radius and the third radius.

In order for the latch to be moved by the cam from the first basic position to the second basic position (the automatic opening position), when the cam rotates in the first rotational direction from the position when the cam is in the first mode to the position when the cam is in the second mode, the extension moves in the direction of approaching the cam. In this step, the extension may not contact the cam or may not be interfered with the cam.

While a contact point of the cam and the contact surface of the latch is moved from the first radius to the second radius as the cam rotates, the sub-contact surface is not interfered with the surface of the cam.

In a second state where the second radius of the cam contacts the contact surface of the latch, the sub-contact surface may face the first radius of the cam and the sub-contact surface may not contact the surface of the cam.

A distance between a position of the sub-contact surface and the center of rotation 7 of the cam while the latch is in the second basic position may be equal to or greater than a radius of the cam surface that faces the sub-contact surface while the second radius 7 of the cam contacts the contact surface of the latch.

In order for the latch to be moved from the first basic position to the third basic position (the secure lock position), while the cam rotates in the second rotational direction from the position when the cam is in the first mode to the position when the cam is in the third mode, when the latch is not smoothly moved in the first direction in spite of a force of applying the elasticity of the elastic body, the cam may force the latch to move to the first direction by interfering the cam with the extension of the latch.

To this end, while the contact point of the cam and the contact surface of the latch is moved from the first radius to the third radius as the cam rotates, the radius of the surface of the cam that faces the sub-contact surface may be set to exceed the distance between the position of the sub-contact surface and the center of rotation of the cam when the latch is in the first basic position.

The radius of the cam surface that faces the sub-contact surface when the third radius of the cam contacts the contact surface of the latch may be greater than the distance between the position of the sub-contact surface and the center of rotation of the cam when the latch is in the first basic position.

Even if the latch is stopped, the cam may forcedly push the latch to move the latch.

The cam surface that faces the sub-contact surface may be the second radius when the third radius of the cam contacts the contact surface of the latch.

The radius of the cam surface that faces the sub-contact surface when the third radius of the cam contacts the contact surface of the latch may be substantially equal to the distance between the position of the sub-contact surface and the center of rotation of the cam when the latch is in the third basic position, then the latch is fundamentally prevented from being rotated in the second direction by an unexpected external force when the latch is in the secure lock position due to the interference between the sub-contact surface and the cam.

If the latch position adjusting profile of the cam may be designed so that the second radius is disposed at one side of the first radius (a contact surface for manual lock) and the third radius is disposed at the other side of the first radius and the cam may be rotated in one direction or rotated in the other direction, the position of the latch may be simply adjusted. In order to implement the adjustment of the position of the latch more simply, the drive may be a motor rotatable in both directions. More simply, the cam may be directly connected to a rotational shaft of the motor.

According to the present disclosure, both the operations of the automatic opening and the complete secure lock of the door are implemented with one latch, which is determined by the basic position of the latch. The basic position of the latch may be determined by the cam and the cam may be controlled by a controller.

If the cam is only rotatable in one direction, the latch may contact the cam in an order of the first radius→the second radius→the third radius→the first radius, or in an order of the first radius→the third radius→the second radius→the first radius.

If the latch contacts the cam in the order of the first radius→the second radius→the third radius→the first radius, the door may be automatically opened before the secure lock of the door, it would be difficult to implement the secure lock function of the door. On the other hand, if the latch contacts the cam in the order of the first radius→the third radius→the second radius→the first radius, the door may be opened by automatic opening after carrying out the secure lock function of the door. Therefore, if the motor rotatable in one direction only is used, the latch is installed such that the motor rotates in a direction in which the latch may contact the cam in the order of the first radius→the third radius→the second radius→the first radius.

The rotational displacement of the cam may be controlled by pressing or releasing the switches installed around the cam as the cam rotates. When the button of the switch is pressed, the switch may be turned on. When the button of the switch is released, the switch may be turned off.

Basically, in order to determine a rotational displacement of the cam based on the three basic positions of the latch (the manual lock position as the position of the latch in a state in which the first radius of the cam contacts the contact surface of the latch, the opening position as the position of the latch in a state in which the second radius of the cam contacts the contact surface of the latch, and the secure lock position as the position of the latch in a state in which the third radius of the cam contacts the contact surface of the latch), three switches may be installed in the positions, respectively, and a pressing boss that presses the switch may be provided in the cam. The first radius contacts the latch when the first switch is pressed and the second radius contacts the latch when the second switch is pressed and the third radius contacts the latch when the third switch is pressed. Then, the basic position of the latch may be adjusted through a control that the motor continues to rotate while no switch is pressed, and the rotation is stopped when the switch is pressed.

It is also possible to control the three basic positions of the latch by using the two switches. The latch module may further include a first switch and a second switch installed at the bracket.

The cam may implement a first mode in which both the first switch and the second switch are pressed, a second mode in which the first switch is pressed and the second switch is not pressed, the third mode in which the second switch is pressed and the first switch is not pressed, and the fourth mode in which both the first switch and the second switch are not pressed depending on a rotation position of the cam.

The cam may further include a switch pressing profile capable of implementing the four modes, separate from the latch position adjusting profile. In other words, the cam may include the latch position adjusting profile and the switch pressing profile and the latch position adjusting profile and the switch pressing profile may be provided separately.

When the cam is rotated so that any one mode (first selected mode) of the first to fourth modes is implemented by the switch pressing profile, the first radius may contact the latch. When the cam is rotated so that the switch pressing profile is in another mode (second selected mode) of the first to fourth modes, the second raids may contact the latch. When the cam is rotated so that the switch press profile is in yet another mode (third selected mode) of the first to fourth modes, the third radius may contact the latch. The other mode of the first to fourth modes may be the fourth selected mode. The first selected mode may be the first mode, the second selected mode may be the second mode, the third selected mode may be the third mode, and the fourth selected mode may be the fourth mode.

The first switch and the second switch may be disposed at substantially the same distance from the center of rotation of the cam. The switch pressing profile may include a first pressing boss that presses the first switch or the second switch or does not press both the first switch and the second switch depending on the rotation position of the cam, and a second pressing boss that presses the first switch or the second switch or does not press both the first switch and the second switch depending on the rotation position of the cam.

The cam may be in a range in the first mode in which the first pressing boss and the second pressing boss press the first switch and the second switch at the same time, respectively, or a range in the second mode in which the second pressing boss presses the first switch and the first pressing boss does not press the second switch, and a range in the third mode in which the first pressing boss presses the second switch and the second pressing boss does not press the first switch, and a range in the fourth mode in which the first pressing boss and the second pressing boss do not both the first switch and the second switch depending on the rotation angle thereof.

The button of the first switch and the button of the second switch have a predetermined angle with respect to the center of rotation of the cam. The first pressing boss and the second pressing boss may also have a predetermined angle with respect to the center of rotation of the cam. The angle may be less than 180° such that the two switches are not arranged on the same straight line passing through the center of rotation of the cam and the two pressing bosses are not arranged on the same straight line passing through the center of rotation of the cam. Preferably, the angle may be 90° or more or less than 180° or may have an obtuse angle. More preferably, the angle may be about 120°.

In the rotation range (the range in the first mode) of the cam where both the first switch and the second switch are pressed, the first radius may contact the latch. In the rotation range (the range in the second mode) of the cam in which the first switch is pressed and the second switch is not pressed, the second radius may contact the latch. In the rotation range (the range in the third mode) of the cam in which the first switch is not pressed and the second switch is pressed, the third radius may contact the latch.

The latch module may be controlled by a controller controlling the operation of automatically opening the door, controlling the operation of securely locking the door, and controlling the operation of securely unlocking the door.

Controlling the operation of automatically opening the door is performed by rotating the cam in the first rotational direction in the first selected mode of the above modes to change the cam to the second selected mode so as to stop the rotation of the cam, and by rotating the cam in the second rotational direction which is an opposite direction of the first rotational direction in the second selected mode to return the cam to the first selected mode so as to stop the rotation of the cam.

Controlling the operation of securely locking the door is performed by rotating the cam in the second rotational direction in the first selected mode to change the cam in the third selected mode to stop the rotation of the cam, so that the door is securely locked, thereby preventing the door being manually opened by the user.

Controlling the operation of releasing the door from the securely locked state is performed by rotating the cam in the first rotational direction in the third selected mode to change the cam in the first selected mode so as to stop the rotation of the cam, so that the door is returned to the state where the secure lock of the door is released and the door is manually opened and closed.

According to the present disclosure, a method of controlling the latch module further includes a position search and a sequence of an initialization control of the cam of the latch module. The search and initialization control may be executed when the cam is in the fourth selected mode in the initial drive of the latch module.

First, the cam is rotated in the second rotational direction. According to the present disclosure, when the initial search drive step of rotating the cam in the second direction is performed in the fourth mode, an error that the door is opened may not occur. Specifically, after the initial search drive step, the cam is changed from the fourth selected mode (the fourth mode) to the first selected mode (the first mode) or to the third selected mode (the third mode).

When the cam is changed from the fourth selected mode (the fourth mode) to the first selected mode (the first mode), the drive of the cam is terminated.

When the cam is changed from the fourth selected mode (the fourth mode) to the third selected mode (the third mode), the cam is rotated in the first rotational direction. Then, the cam is changed to the first selected mode (the first mode) via the fourth selected mode (the fourth mode). When the first mode is thus set, the drive of the cam is terminated.

While the user uses the cooking device, the cam may not be in the second selected mode (the second mode) during the initial search drive step. However, just after manufacturing the product, the cam may be in the second mode during the initial search drive step, for just one chance. In this case, during the initial search drive step, after the cam is changed to the second selected mode, the cam is further rotated in the second rotational direction, and the cam is changed to the first selected mode (the first mode), the drive of the cam may be terminated.

The present disclosure further provides a cooking device to which the latch module and the method of controlling such latch module are applied. Further, the present disclosure may be applied not only to the cooking device, but also to an appliance including a main body having a cavity and a door that opens and closes such main body.

According to the present disclosure, a structure of the latch module applied to a cooking device may implement a manual lock function of the door and a secure lock function of a door for an operation of self-cleaning by one latch.

Further, according to the present disclosure, the structure of the latch module may implement an automatic opening function of a door and a secure lock function of a door while one latch, one drive, and one power transmission are applied.

Further, according to the present disclosure, in the structure of the latch module, it is possible to manually open and close the door by an elastic body, and also to perform a secure lock of the door by the elastic body. In addition, an interference structure of the latch and the cam complements a secure lock function of the elastic body. Therefore, even if abnormality occurs during operation of the elastic body, an operation of securely locking the door may be made by the cam.

Further, according to the present disclosure, the structure of the latch module may prevent the latch in the secure lock state from being released by an unexpected external force due to the interference between the cam and the latch. Therefore, all operations may be implemented by one latch and one cam.

Further, according to the present disclosure, in the structure of the latch module, the automatic opening of the door and secure lock of the door may be controlled through the two switches and a simple control.

Further, according to the present disclosure, a method of controlling the latch module may only perform the initial position search of the cam and the latch with a simple control algorithm and the door may not be opened unintentionally in the initial search step.

DETAILED DESCRIPTION OF EXEMPLARY EMBODIMENTS

Hereinafter, the present disclosure will describe in detail embodiments of the invention with reference to the accompanying drawings.

The present disclosure may be implemented in many different manners and is not limited to the embodiments set forth herein. Certain features of the embodiments may be omitted and features of one embodiment may be combined with features of another embodiment. The embodiments are provided so that this disclosure will be thorough and complete, and will enable those skilled in the art to make and use of the invention.

Hereinafter, according to an embodiment, an overall structure of a cooking device to which a method of automatically opening a door is applied will be described. However, it should be noted that the embodiments are not limited to a cooking device. The embodiments may be applied to all appliances having a pull-down door. An appliance may be that used in a home or commercially.

Figure 1:
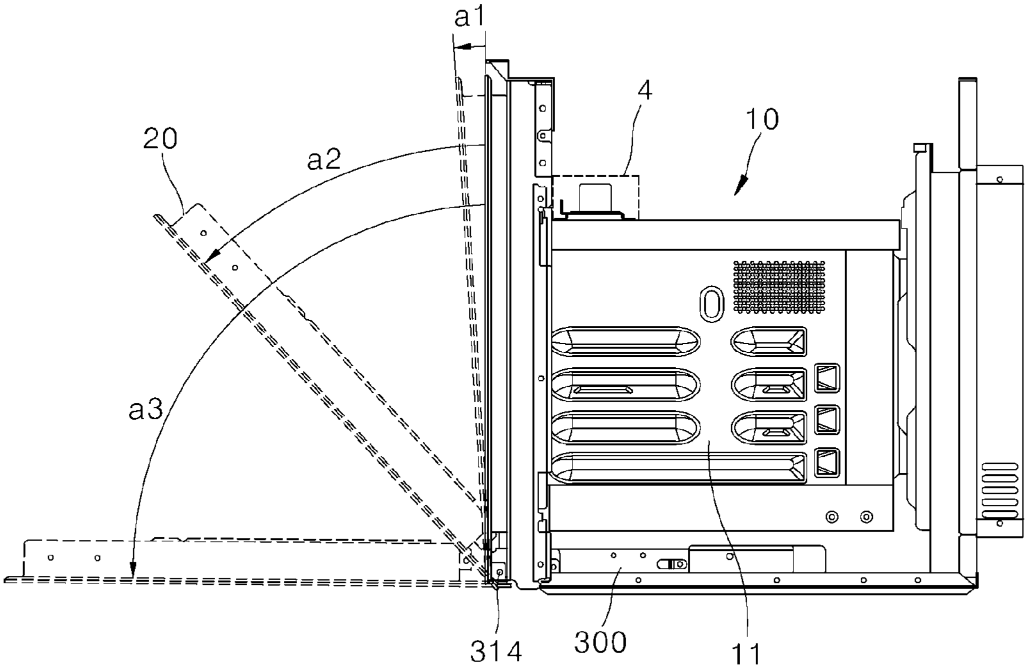
FIG. 1 is a side view of a cooking device including a latch module according to an embodiment of the invention.

Referring to FIG. 1, according to an embodiment of the invention, an oven as a cooking device will be described as an example of an appliance. According to the present disclosure, the appliance is not limited to a cooking device and a cooking device is not limited to an oven.

The cooking device includes a main body 10 having a substantially rectangular parallelepiped shape, an open front, and a cavity, and a door 20 installed at a front of the main body 10 that can cover the cavity.

The main body 10 includes an outer housing (not shown in FIG. 1 to show an inner structure of the main body) that defines an outer appearance of the cooking device and an inner housing 11 installed in the outer housing. The inner housing may be provided with the cavity opened forward. The cavity forms a cooking chamber. In an upper portion, a lower portion, a rear portion, and side portion of the main body 10, various components needed for operation of the cooking appliance may be provided.

The door 20 has a pull-down opening and closing structure about a horizontal hinge shaft 314 disposed at a lower end of the door. In other words, the door 20 is rotated forward and downward with respect to the main body to be opened and is rotated rearward and upward with respect to the main body to be closed.

Figure 19:
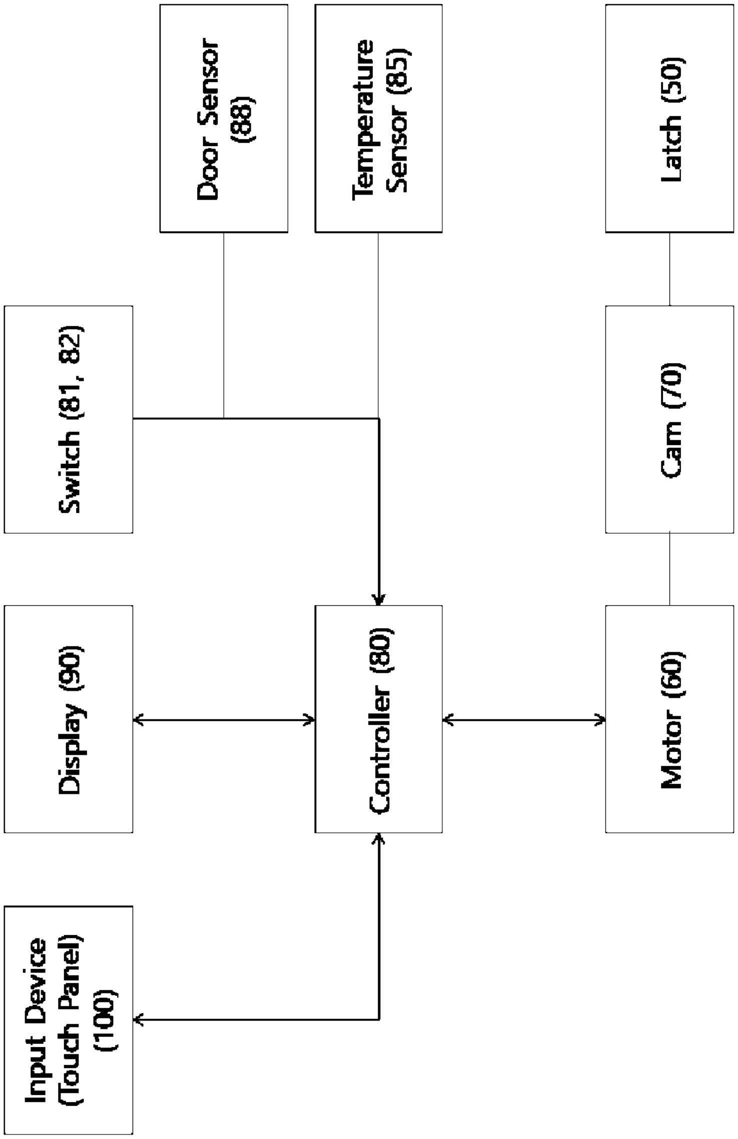
FIG. 19 shows a control system including a controller.

As shown in FIG. 1, the door 20 may open or close the front of the cooking chamber, and may cover not only the cooking chamber but also a front of an upper space of the cooking chamber. A display and a touch panel, and the like may be installed on a front surface of the door 20 with respect to the upper space of the cooking chamber. As shown in FIG. 19, the display 90 and the touch panel 100 are connected to the controller 80. The controller 80 may be installed on an upper space of the cooking chamber or in the door 20 corresponding to the upper space of the cooking chamber.

A latch module 4 is provided at an upper side of the main body 10. The latch module 4 maintains a state where the door 20 is closed, or allows for manually opening or closing of the door 20, or automatically opens the door 20, or securely locks the door 20 so that the door cannot to be manually opened. A pin 22 that is engaged with or released from a hook 51 of a latch 50 of the latch module 4 and an accommodation 21 that has the pin 22 are provided on a rear surface of the door 20 (see, for example, FIG. 9(*a*)). The accommodation 21 provides a space capable of accommodating the hook 51.

The latch module 4 may be installed on the main body 10 and a distal end of the latch 50 of the latch module 4, i.e., the hook 51 may protrude forward from the front surface of the main body 10.

The latch module 4 may be installed at one side on the door or on both sides of the door, and the pin 22 and the accommodation 21 of the door may be provided corresponding to the latch module.

Figure 2:
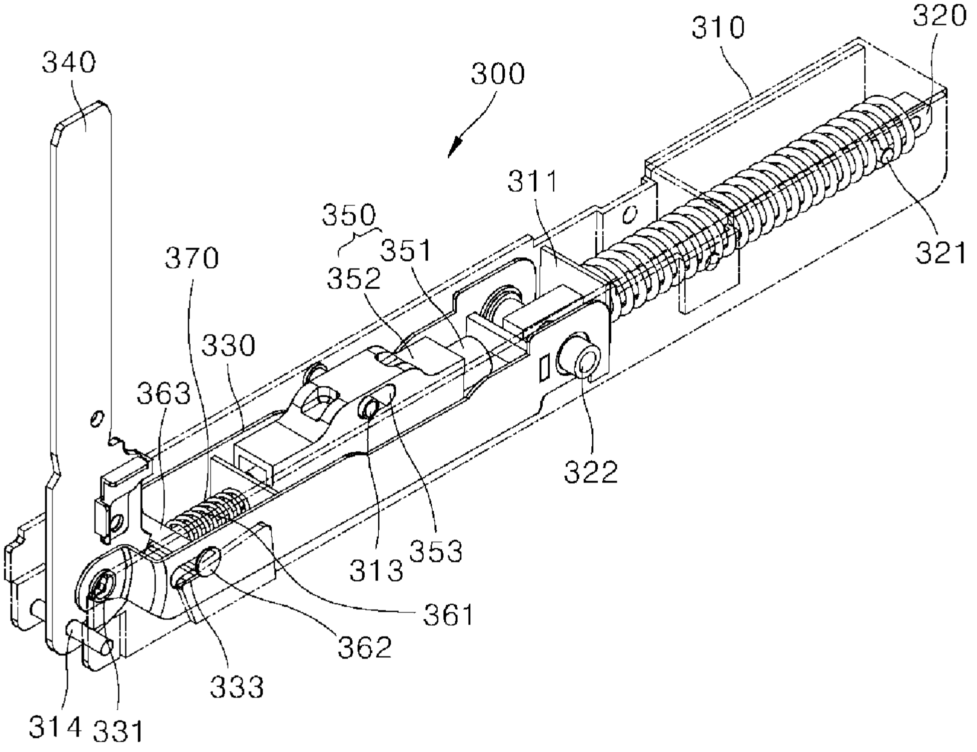
FIG. 2 is a transparent perspective view of a hinge module that connects a door and a main body of a cooking device according to an embodiment of the invention.
Figure 3:
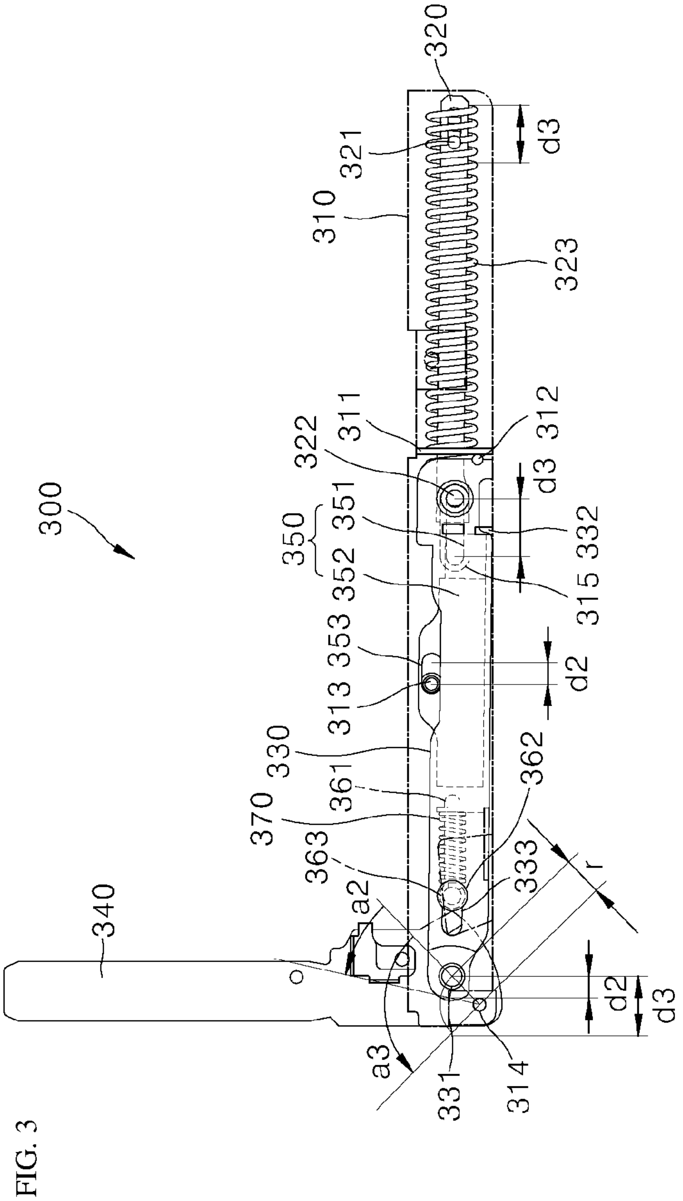
FIG. 3 is a side view of FIG. 2.

FIGS. 2 and 3 illustrate a hinge module 300 that connects a door and a main body of a cooking device according to an embodiment of the invention. The hinge module 300 includes a spring 323, a damper 350, and a sub-spring 370, and is connected to a front lower portion of the main body and a lower portion of the door. The spring 323 applies a force of moving the door in a direction of rotating a door 20 rearward and upward, i.e., the direction of closing the door. Accordingly, the spring 323 opposes a force opening the door while the door is being opened and descending.

Further, while the door is being opened, the damper 350 damps a rotational force of the door to cause the door to be opened slowly. As necessary, the damper 350 may only provide a damping force while the door is being opened, or may provide the damping force while the door is being opened and while the door is being closed. The damping force may be provided in all rotation angles in which the door is opened and/or closed, or the damping force may be provided in a range among the rotation angles.

The damper 350 may damp a force of opening the door at a predetermined opening angle section of the door and may not provide the damping force in a section beyond the opening angle section in which the damping force is provided. FIG. 1 shows a structure in which the damper is damping in an opening angle section of an opening door corresponding to a2 to a3. A damping beginning in angle a2 in which the damping starts when the door is being opened may be 35±5°.

The sub-spring 370 applies a force in a direction of opening the door 20. An opening angle range in which the sub-spring 370 applies the force in the direction of opening the door may be 0° to a1.

Hereinafter, an operation of automatically opening a door will be described with reference to FIGS. 1 to 3. In this embodiment, when a user touches a touch panel and the like to input a command of opening the door, a latch module 4, which will be described later, releases an engaged state of the closed door. The door is opened by an elastic force of the sub-spring 370 of the hinge module 300 to an initial opening angle a1. The predetermined angle a1 may be set to such an extent that the door may be subsequently further opened by the weight of the door itself. The angle a1 may be, for example, about 10°.

The hinge module 300 connecting the main body 10 and the door 20 includes a door bar 340 fixed to the door 20 and a housing 310 fixed to the main body 10 that rotate about an opening and closing rotational shaft 314. In another embodiment, the bar may be fixed to the main body and the housing may be fixed to the door.

In the housing 310, an inner link housing 330 is provided which is movable along a longitudinal direction of the housing. A distal end of the inner link housing 330 is connected to the door bar 340 by a door bar connecting hinge 331. As the door bar connecting hinge 331 is disposed eccentric from the opening and closing rotational shaft 314 by a distance of r, when the door 20 (the door bar 340) opens, the door bar connecting hinge 331 rotates about the opening and closing rotational shaft 314 and moves forward. Accordingly, the inner link housing 330 also moves forward in the housing 310.

As the door 20 or the door bar 340 is opened from a closed state (vertical state) to an opened state (horizontal state) while being rotated forward of the main body, a maximum opening angle a3 is 90°. Accordingly, the connecting hinge 331 also rotates by 90° about the opening and closing rotational shaft 314. The inner link housing 330 also moves forward by a horizontal distance d3 in which the opening and closing rotational shaft 314 rotates by 90°.

An insert pin 361 is installed in front of the inner link housing 330. A slot pin 362 provided in front of the insert pin 361 and is fitted into a guide slot 333 formed longitudually at both sides of the inner link housing 330. Accordingly, the insert pin 361 is slidably installed forwardly and rearwardly in the inner link housing 330 within a range allowed by the guide slot 333. The insert pin 361 is inserted into the sub-spring 370. A front portion of the sub-spring 370 is supported by the slot pin 362 and the rear portion thereof is supported by the inner link housing 330. Accordingly, the sub-spring 370 applies the force of moving the slot pin 362 forward through the guide slot 333.

A contact surface 363 of the slot pin 362 pushes an inclined surface provided at a lower rear end of the door bar 340 forward. As shown in FIGS. 2 and 3, as a height at which the slot pin 362 pushes the inclined surface forward is higher than a position of the opening and closing rotational shaft 314, at the beginning of opening the door, in the state where the door bar 340 stands vertically (closed state), the sub-spring 370 applies the force of moving the door bar 340 in a direction of rotating the door bar 340 forward and downward. Accordingly, at the beginning of opening the door, the sub-spring 370 opens the door by the initial opening angle a1. After the slot pin 362 moves to the foremost position of the guide slot 333, the slot pin 362 does not move further and the sub-spring 370 does not apply force on the door bar 340.

Of course, in the section corresponding to the state where the door is closed to the state where the opening angle of the door is the initial opening angle a1, a pressing force of the spring 323 in the direction of closing the door is less than a pressing force of the sub-spring 370 in the direction of opening the door. Thus, in this section, the net force is a force applied to the door in the opening direction thereof.

Figure 4:
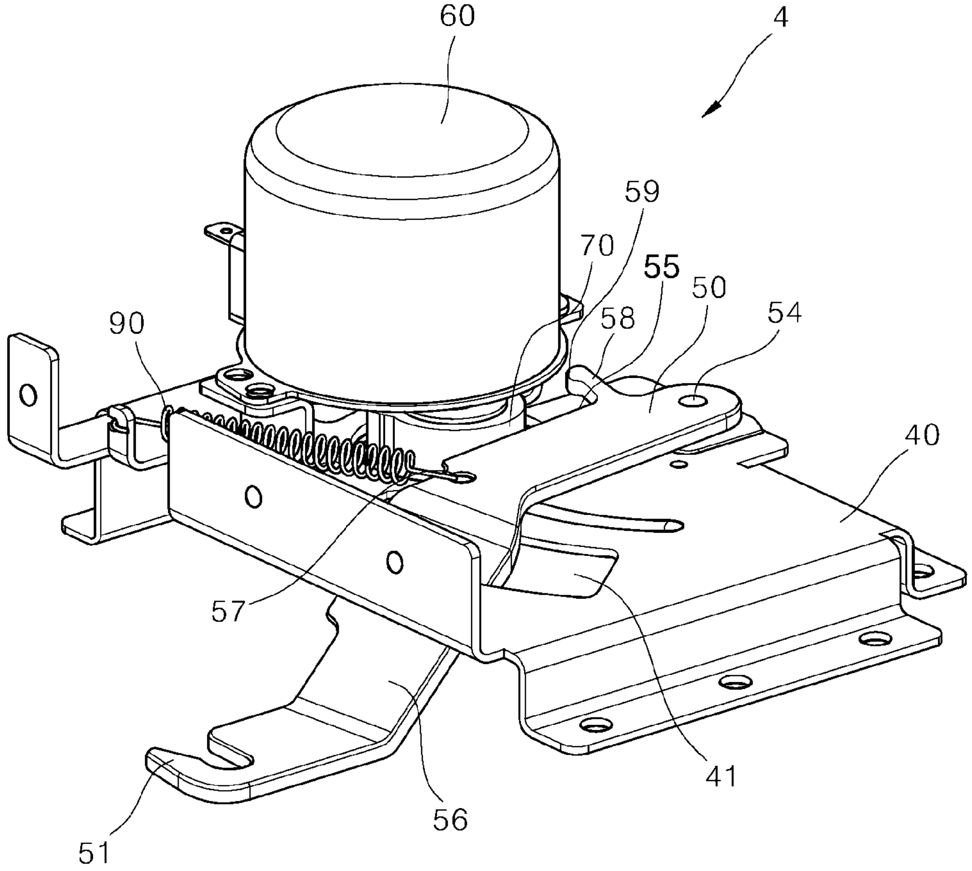
FIG. 4 is a perspective view of a latch module according to an embodiment of the invention.

Note that in a closed state of the door, a force which is transferred from the pin 22 to the hook 51 of the latch 50 to move the latch in a second direction w2 (see FIG. 6) by an opening force of the sub-spring 370 is weaker than a force which is applied to the latch 50 to move the latch in a first direction w1 by a spring in the latch module 4 (for example, see FIG. 4), when the latch 50 is in a manual lock state, and thus the door maintains the closed state in spite of the force of the sub-spring 370 of a hinge module 300 to open the door.

After the door reaches the initial opening angle a1 from the closed state, the door starts to open by the weight of the door itself. As the door bar 340 rotates about the housing 310 to further open the door, a damping force along with an opposing force against the door being opened are exerted on the door bar 340 by a damper 350 and a spring 323 to be described later.

A second insert pin 320 inserted inside of the spring 323 is installed at a rear of the inner link housing 330. The second insert pin 320 is connected to the rear of the inner link housing 330 through a joint pin 322 at the inner housing. Both ends of the joint pin 322 at the inner housing are fitted to a guide slot 315 provided at the housing 310. The guide slot 315 for the joint pin 322 has an elongated shape extending along the longitudinal direction of the housing 310.

The second insert pin 320 is inserted into the compressed coil spring 323 having greater elasticity in a compressed state. The second insert pin 320 may slidably move along the longitudinal direction of the housing 310 through a spring-engaged plate 311 fixed to the housing 310. However; the distal end of the compressed coil spring 323 is engaged with the spring-engaged plate 311 of the housing 310 and a supporting pin 312 that supports the spring-engaged plate 311 may be installed in the housing 310 so as to maintain the force of the compressed coil spring 323.

A spring supporting pin 321 that fixes a rear end of the spring 323 is installed at a rear end of the second insert pin 320. The spring supporting pin 321 does not interfere with the housing 310.

Accordingly, when the door bar 340 opens from the main body 20, the joint pin 322 of the inner link housing 330 is guided by the guide slot 315 of the housing 310, and the inner link housing 330 and the second insert pin 320 are moved forward. Accordingly, the spring 323 starts to compress between the spring-engaged plate 311 and the spring supporting pin 321, and the elastic force is gradually increased. The compression length d3 of the spring 323 corresponds to the horizontal movement distance d3 of the inner link housing 330 in which the opening and closing rotational shaft 314 rotates by 90°. When the opening angle of the door is less, the elastic force of the spring 323 is less. However, as the opening angle of the door is increased, the elastic force of the spring 323 is increased. The elastic force is applied in a direction of opposing the door being opened.

A force in which the spring 323 pushes the door in the closing direction thereof when the door is opening is gradually increased from the opening angle a1 to the opening angle a3 of the door. As the force of the spring 323 at the opening angle a1 of the door is less than the force (the opening force) in which the door is opened by the weight of the door itself at the opening angle a1, the door pushed to the opening angle a1 by the sub-spring 370 starts to open by itself.

The damper 350 is installed in the inner link housing 330. A piston 351 of the damper 350 is supported by a damper pushing surface 332 integrally fixed to the inner link housing 330. The piston 531 is inserted into a cylinder 352. A slot 353, in which a damper supporting pin 313 fixed to the housing 310 is fitted into is provided at the cylinder 352. That is, the cylinder 352 may move forward or backward by the length of the slot 353. FIG. 3 shows a position between the slot 353 of the damper 350 and the damper supporting pin 313 of the housing 310 while the door is closed.

As the door opens and is rotated by a predetermined angle a2, the inner link housing 330 moves forward in the horizontal direction by distance d2. Accordingly, the damper 350 is moved forward by the damper pushing surface 332 of the inner link housing 330 and moves together. As the damper is pushed forward, the damper pushing surface 332 pushes the piston 351 forward; however, the slot 353 of the cylinder 352 has not engaged with the damper supporting pin 313. Thus, the piston 351 and the cylinder 352 move forward together with the inner link housing 330, and does not generate any damping force.

As soon as the opening angle of the door exceeds a2, the slot 353 of the damper 350, which has been moving forward, is engaged with the damper supporting pin 313, so that the cylinder 352 stops moving and the piston 351 engages with the cylinder 352 such that the damper 350 starts to compress. The damping force generated when the damper 350 compresses enables opening the door at a controlled speed in the section corresponding to the opening angle a2 to a3.

For reference, a maximum damping distance (Lmax) of the damper 350 itself, that is, a maximum stroke capable of generating the damping force by compressing in the damper, is set to be equal to or greater than the distance d3−d2 in which the inner link housing 330 moves while the damping force is applied to the door.

When the closed door is opening to opening angle a2, the door bar connecting hinge 331 also rotates by angle a2, so that the inner link housing 330 and the second insert pin 320 move forward by distance d2. While the inner link housing 330 and the second insert pin 320 inserted inside of the spring 323 move by the distance d2, the slot 353 of the damper 350 moves without interference from the damper supporting pin 313 of the housing 330, and thus the piston 351 and the cylinder 352 of the damper do not engage. That is, in the section corresponding to the opening angle of 0 to a2 of the door, the elastic force of the spring 323 is applied in a direction opposite to the opening force of the door to control the opening speed of the door, but the damping force is not applied.

When the closed door is opening to opening angle a3, the door bar connecting hinge 331 also rotates by angle a3, so that the inner link housing 330 and the second insert pin 320 move forward by distance d3. That is, the spring 323 is compressed by distance d3. That is, the elastic force of the spring 323 is applied in a direction opposite to the opening force of the door in the section from 0° to a3 of the opening angle, and an opening speed of the door is controlled by the elastic force.

The maximum opening angle a3 may be regulated by the guide slot 315 of the housing 310 by regulating a slidable movement distance of the joint pin 322 of the inner link housing 330 within the guide slot 315.

The angle range in which the damper 350 damps the opening force of the door may start when the door is rotated about 30° to 40°, for example, and may be continued until the door is rotated by 90°. To summarize, the door is opened in a closed state by the sub-spring 370 to the initial opening angle a1, and then opened by its own weight while being opposed by the elastic force of the spring 323. When the door is rotated by opening angle a2 (about 30° to 40°), the damping force of the damper 350 is applied to the door so that the opening speed of the door is slowed down. The manner of opening the door as described above makes the user feel comfortable.

Note that if the damping starts too early as the door is opening, time for waiting for the door to be completely opened may take too long, resulting in an inconvenience to the user. On the other hand, if the damping of the door starts too late, the door may be opening too quickly to an extent that the opening speed of the door is too fast, and thereby the user may be surprised or feel uncomfortable, or the user may get injured by the quickly opening door.

Thus, according to the embodiment, the damping beginning angle a2 at which the damper 350 starts to damp the opening force of the door is 35±5°.

The damping force may be continuously applied up to 90° at which the door is completely opened or up to 85° which is about 5° less. It is also conceivable that the damping force is not applied for an opening angle greater than 85° to prevent the door from being opened less than 1° to 2° of the 90° required to completely open the door.

As described above, the damping beginning angle a2 is set to be greater than the forcedly opened angle a1. A section between the forcedly opened angle a1 and the damping beginning angle a2, for example, a range of 10° or more and 30° to 40° or less is configured so that the door is opened by the weight of the door itself without being damped by any damper 350. Of course, even in this section, the above-described elastic force of the spring 323 is applied in a direction that opposes the opening of the door, so that the opening of the door is sufficiently prevented from opening too quickly in the section in which the door is opening by the weight of the door itself.

When such a structure of automatically opening the door is applied, it is possible to reduce user anxiety, and increase a quality of the door being opened automatically, and there may be no need to install a handle protruding forward from the door, thereby providing excellent appearance to the user in the built-in installation.

Hereinafter, according to an embodiment, a latch module 4 capable of automatically opening a door or completely locking a door of a cooking device will be described with reference to FIGS. 4 to 13(*b*).

According to the embodiment, the latch module 4 includes a bracket 40 as an overall base. The bracket 40 may be made of sheet metal. An edge of a rectangular metal plate is bent downward or upward. Accordingly, a structure in which the latch module 4 may be fixed to another body and a structure in which various parts, such as a drive 60, an elastic body 90, and the like may be installed in the bracket 40 are provided.

The bracket 40 includes a cam accommodating hole 42 that provides a space that accommodates a cam 70 which is a power transmitting portion and an through-hole 41 capable of regulating a section in which a latch 50 pivotally installed in the bracket 40 pivots.

The latch 50 is pivotally installed on the bracket 40. The latch 50 has a structure having a bent long metal plate, and a rear end of the latch 50 is provided with a pivot shaft 54 as a center of pivot of the latch 50 about the bracket 40. As the pivot shaft 54 is installed in a pivot hole (not shown), the latch 50 is pivotally installed on the bracket 40.

A rear portion of the latch 50 including the pivot shaft 54 is arranged over the bracket 40. On one side of the latch 50 arranged over the bracket 40, a contact surface 55 is provided to be in contact with a latch position adjusting profile 73 of the cam 70 and an extension 58 is provided that interacts with the cam 70 to mechanically complement an operation error of the latch 50. The extension 58 extends vertically from the contact surface 55 and a substantially 'L'-shape is formed between the contact surface 55 and the extension 58.

An insertion portion 56 is formed at an intermediate portion of the latch 50 that is bent downward and forward so as to decline from a front end of the rear portion and is inserted through the through-hole 41 of the bracket 40. The through-hole 41 has an arc shape and has a size that accommodates a locus of the swivel of the latch 50 when the insertion portion 56 is inserted into the through-hole 41.

An arc-shaped sliding bead surface 43 that supports the pivoting of the latch 50 is provided at a position closer to the pivot shaft 54 than the through-hole 41 at the bracket 40. The sliding bead surface 43 protrudes from the surface of the bracket to contact a bottom surface of the latch 50, thereby preventing friction from occurring via a direct contact of a top surface of the bracket 40 and the bottom surface of the latch 50.

A front end of the insertion portion 56 is bent forward again to extend forward in the horizontal direction, i.e., parallel with the rear portion. A hook 51 is provided at a distal end of the latch 50. The hook 51 engages with or releases from a pin 22 of the door.

The latch 50 includes a hole 57 capable of engaging with an end of a spring 90 that acts as an elastic force. The spring 90 has one end fixed to the hole 57 and an other end fixed to the bracket 40. Accordingly, the spring 90 pulls the latch 50 towards the spring. The spring 90 is arranged to be adjacent to a first direction w1 of the pivoting direction of the latch 50 and applies a force so as to pivot the latch 50 in the first direction w1.

The cam 70 is rotatably installed to be adjacent to the first direction w1 of the latch 50. A hole 711 as the center of rotation of the cam 70 is disposed vertically on the cam so that the cam 70 has a vertical rotational axis. The cam 70 is installed into the cam accommodating hole 42 of the bracket 40 so that an upper portion of the cam 70 is exposed over the bracket 40 and a lower portion of the cam 70 is exposed below the bracket 40.

The cam 70 includes the latch position adjusting profile 73 that contacts the contact surface 55 of the latch 50 described above and adjusts the position of the latch 50 based on a rotational position of the latch position adjusting profile 73, and a switch pressing profile 72 that presses the switches 81 and 82 to be described later or press-releases the switches 81 and 82.

The latch position adjusting profile 73 is provided at the upper portion of the cam, and the switch pressing profile 72 is provided at the lower portion of the cam. The latch position adjusting profile 73 is exposed above the bracket 40 and contacts the contact surface 55 of the latch 50 when the cam 70 is installed on the bracket 40. The switch pressing profile 72 is exposed below the bracket 40 and presses or press-releases the switches 81 and 82 to be described later provided at the lower portion of the bracket 40.

For reference, a material of the cam 70 may be a synthetic resin having good strength and heat resistance, such as poly phenylene sulfide (PPS), and thereby abrasion generated when the cam rotates is minimized and stability in an environment of the home appliance having high temperature may be provided.

The cam 70 is rotationally driven by a motor 60 as a driver. According to the embodiment, the cam 70 may be directly connected to the rotational shaft 61 of the motor 60. The motor 60 may be a bi-directional rotational motor capable of both clockwise rotation and counter-clockwise rotation. The motor 60 is fixed to the upper portion of the bracket 40 such that the rotational shaft 61 extends downward and the rotational shaft 61 is inserted into the axis hole 711 of the cam 70.

The first switch 81 and the second switch 82 are installed at the bottom surface of the bracket 40. The first switch 81 and the second switch 82 may be a micro switch having buttons 811 and 812, respectively. The buttons 811 and 812 of the switches provided on the bracket protrude to substantially face a center of the cam. The buttons 811 and 812 are arranged with an angle b of 90° or more and less than 180° with respect to the center of rotation 711 of the cam and may be arranged at the same distance from the center of rotation of the cam. Preferably, the angle b may be in the range of 110° to 160°, and more preferably in the range of 120°.

Figure 6:
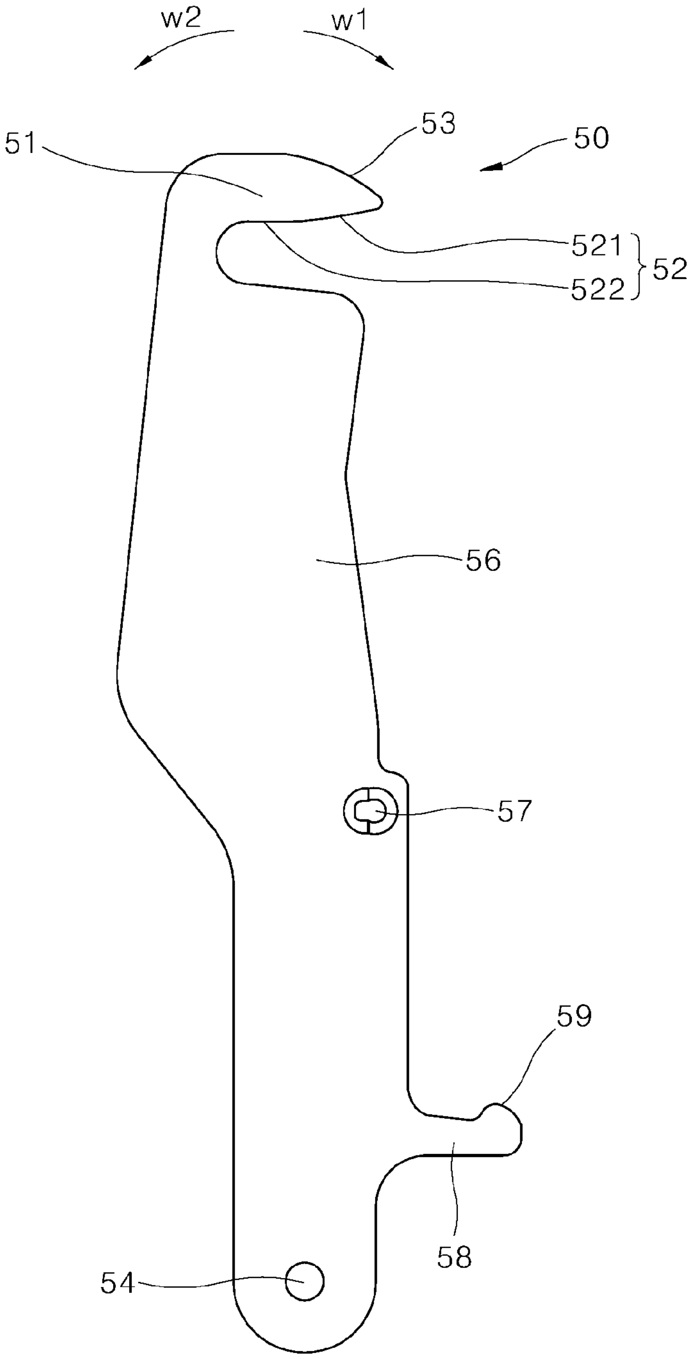
FIG. 6 is a top view of a latch of the latch module of FIG. 4.

Referring to FIG. 6, a latch according to an embodiment will be described. The hook 51 is provided at the distal end of the latch 50, that is, a front end thereof, is opened laterally, specifically, in a first direction w1 in which the latch 50 pivots. Inward of the hook 51, an engaging surface 52 that engages with the pin 22 of the door is provided. The engaging surface 52 includes a disengaging inclined surface 521 and a secure lock surface 522. The disengaging inclined surface 521 is arranged closer to the first direction w1 on the engaging surface 52 and the secure lock surface 522 is arranged closer to a second direction w1 in which the latch 50 pivots in the engaging surface 52. That is, the disengaging inclined surface 521 is arranged closer to the opening end of the hook 51 than the secure lock surface 522 which is arranged deeper into the hook 51.

The disengaging inclined surface 521 has a surface inclined with respect to a horizontal axis in an opening direction of the door toward the first direction w1. When the latch 50 pivots about a pivot shaft 54 in the first direction w1, the pin 22 of the door contacts the disengaging inclined surface 521 and the latch 50 is disposed in the manual lock position.

The secure lock surface 522 has a surface inclined with respect to the horizontal axis in the closing direction of the door toward the second direction w2. When the latch 50 pivots further in the first direction w1, the pin 22 contacts the secure lock surface 522 and the latch 50 is disposed in a secure lock position.

The disengaging inclined surface 521 and the secure lock surface 522 are connected with a smooth curved surface. Thus, as the latch 50 pivots, when the pin 22 of the door in contact with the disengaging inclined surface 521 slides adjacent to the secure lock surface 522, the sliding may be smoothly made over to the secure lock surface 522. In particular, as the movement of the latch 50 is made by an elastic force of the spring 90, the movement of the latch 50 may be more reliably made if the sliding between the disengaging inclined surface 521 and the secure lock surface 522 is made smooth.

An inclined insertion surface 53 is provided on an outer surface of the hook 51 opposite to the disengaging inclined surface 521. The inclined insertion surface 53 is inclined with respect to the horizontal axis in the closing direction of the door toward the second direction w2 when the latch 50 is in the manual lock position. The inclined insertion surface 53 contacts the surface of the pin 22 of the door when the latch is in the manual lock position. That is, the hook 51 has a shape that gradually becomes thinner, that is, sharper, toward the end by the disengaging inclined surface 521 and the inclined insertion surface 53. The inclined insertion surface 53 may extend to the outer surface of the hook 51 that is opposite to the secure lock surface 522.

The contact surface 55 of the latch 50 in contact with the cam 70 is provided at the side of the latch 50. The contact surface 55 is arranged in adjacent to a second direction w2 about the center of rotation of the cam. An extension 58 extending outward from the contact surface 55 is further provided at one end of the contact surface 55. The extension 58 and the contact surface 55 have a substantially 1'-shape and the contact surface 55 and the extension 58 are arranged to surround the cam 70.

An sub-contact surface 59 is provided laterally with respect to an extending direction of the extension 58, which faces the cam, and in some cases contacts and interacts with the surface of the cam. The sub-contact surface 59 protrudes from the extension 58 so that other than the sub-contact surface 59, other portions of the extension 58 does not interact with the cam 70.

The sub-contact surface 59 approaches the cam 70 when the latch 50 pivots in the second direction w2. The sub-contact surface 59 moves in a direction away from the cam as the latch 50 pivots in the first direction w1.

The extension 58 is not necessarily integrally formed with a body of the latch 50, but may be manufactured as a separate component and then assembled. The extension 58 does not have to behave like a rigid body with the body of the latch 50. It is enough for the extension 58 to transmit such a force to the body of the latch 50 that the cam 70 moves the extension 58 in the first direction w1 and the latch 50 moves from a first basic position (see FIG. 9(*b*)) to a third basic position (see FIG. 13(*b*)) or the latch is in the third basic position.

Figure 10B:
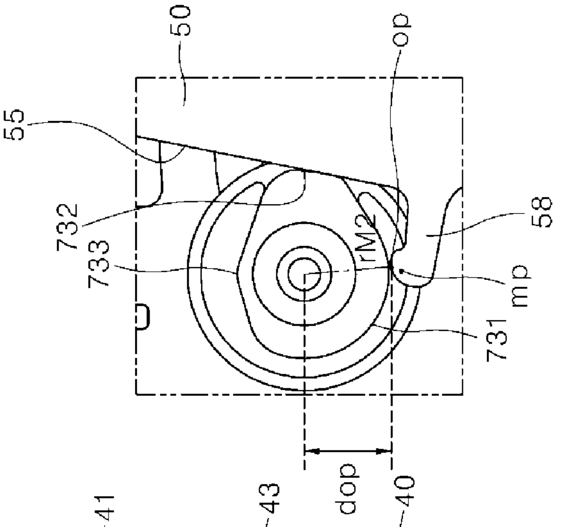
FIG. 10(*a*) is the bottom view of the cooking device, and FIG. 10(*b*) is the plan view of the cam and the part of the latch in contact with the cam, both representing a state where the latch module is operated and the latch moves to the open position.
Figure 10A:
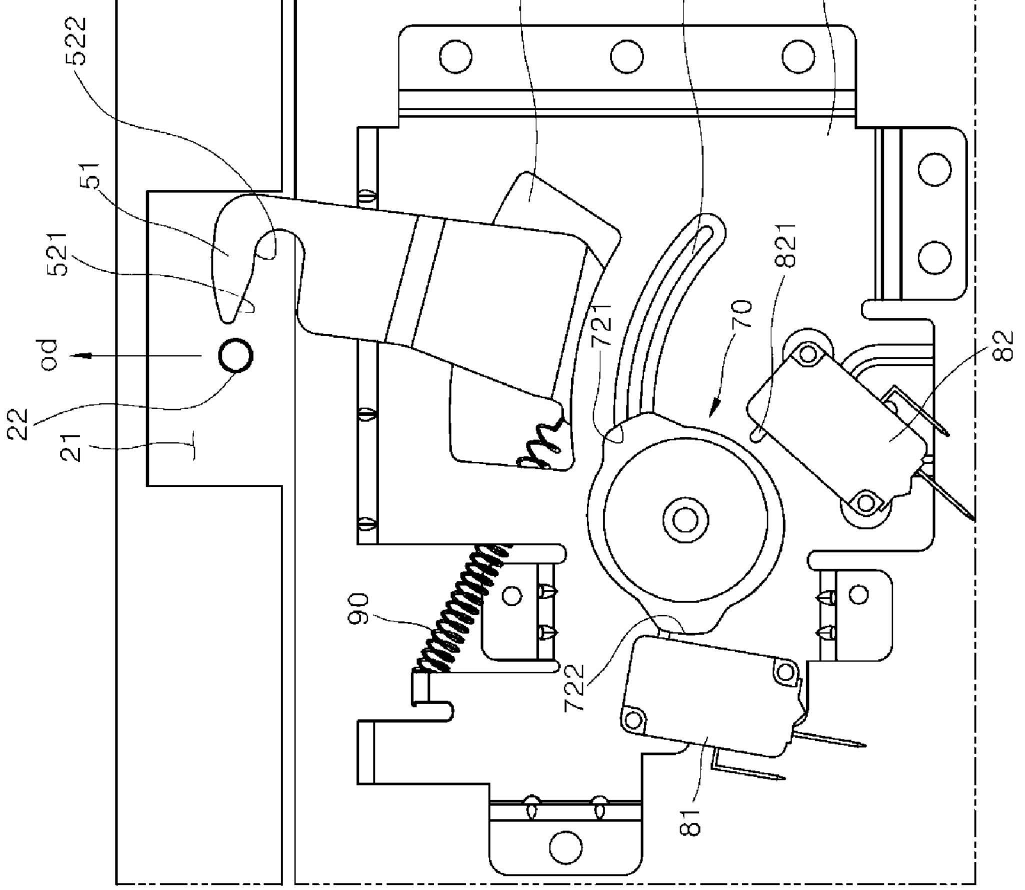

When the force is applied to the contact surface 55 of the latch 50 by the cam 70 in the second direction w2, that is, the latch 50 is pivoted from the first basic position to the second basic position (see FIG. 10(*b*)) by the cam 70, the extension 58 does not interact with the cam 70.

A feature of the sub-contact surface 59 will now be described. The cam may include an oblong shape. When the cam 70 rotates and the radius of the cam 70 in contact with the contact surface 55 of the latch 50 is reduced, the latch 50 pivots in the first direction w1, and the radius of the cam 70 that faces the sub-contact surface 59 of the latch 50 increases. When the latch 50 does not pivot in the first direction w1 although the radius of the cam 70 contacting the contact surface 55 of the latch is reduced so that the latch 50 can pivot in the first direction w1, the radius of the cam 70 that faces the sub-contact surface 59 increases sufficiently as to interact with the sub-contact surface 59, and the sub-contact surface 59 is pushed in a direction away from the cam 70 so that the latch 50 may be forcedly pivoted in the first direction w1.

Figure 9B:
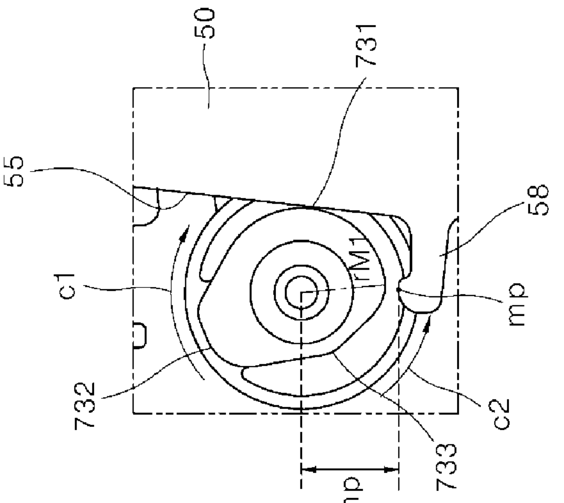
FIG. 9(*a*) is a bottom view of a cooking device having the latch module of FIG. 4, and FIG. 9(*b*) is a plan view of the cam and a part of the latch in contact with the cam, both representing a state where the latch is engaged with a pin of a door while the latch is in a manual lock position.
Figure 9A:
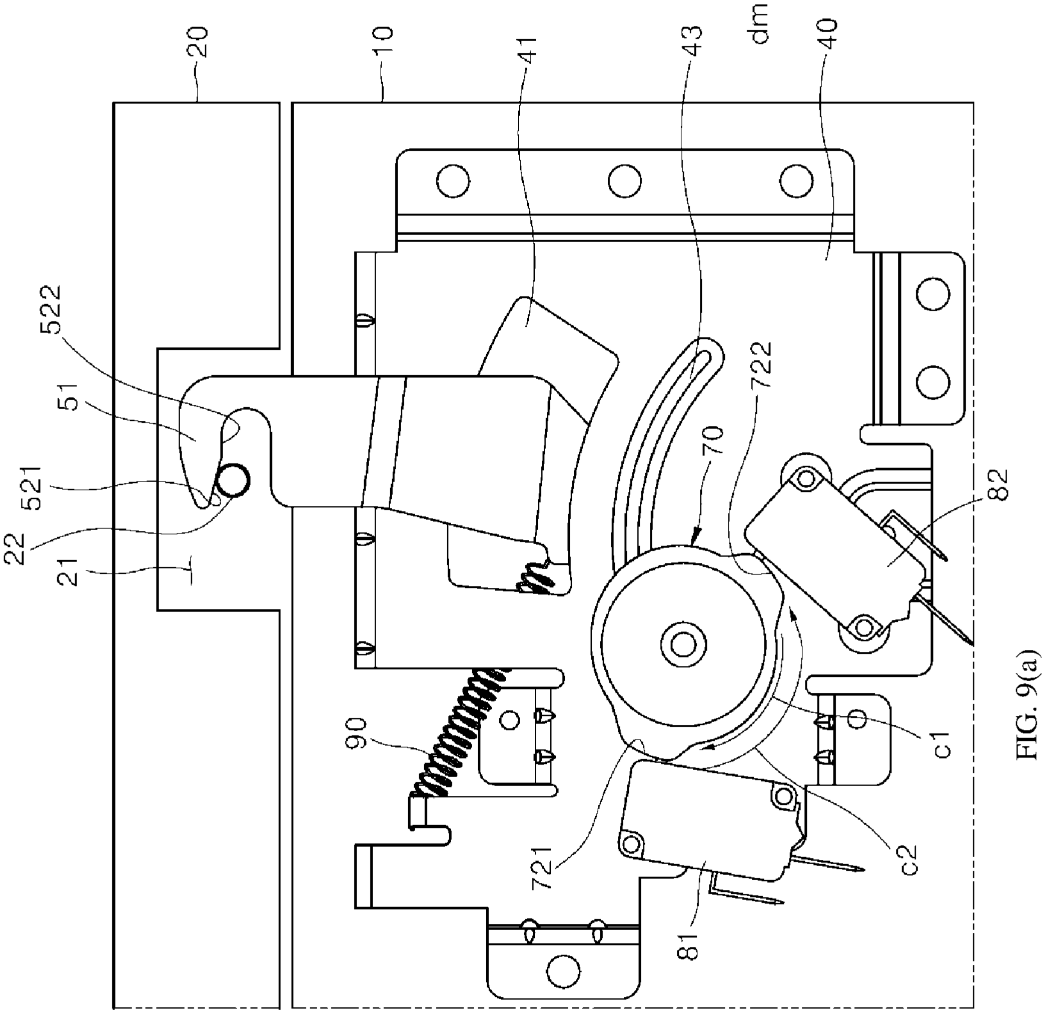
Figures 13A, 13B:
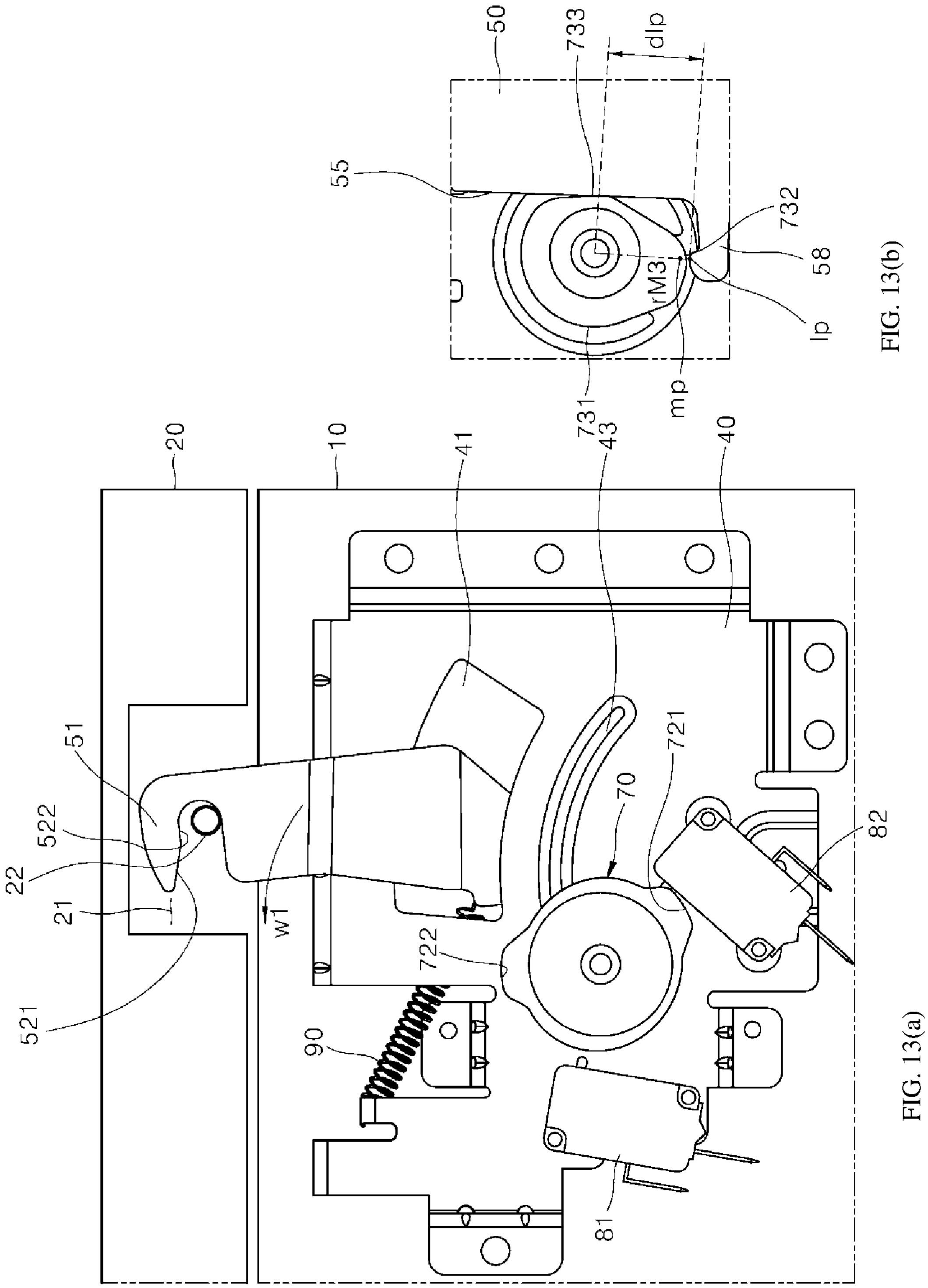
FIG. 13(*a*) is the bottom view of the cooking device, and FIG. 13(*b*) is the plan view of the cam, both representing a state where the latch module operates and the latch is moved to the secure lock position.

A distance dmp between the center of rotation of the cam 70 and the sub-contact surface 59 when the latch 50 is in the first basic position (see FIG. 9(*b*)) and a distance dop between a center of rotation of the cam 70 and the sub-contact surface 59 when the latch 50 is in the second basic position (see FIG. 10(*b*)), and a distance dlp between the center of rotation of the cam and the sub-contact surface when the latch is in the third basic position (see FIG. 13(*b*)) has a relationship of $dop<dmp<dlp$.

Figure 5:
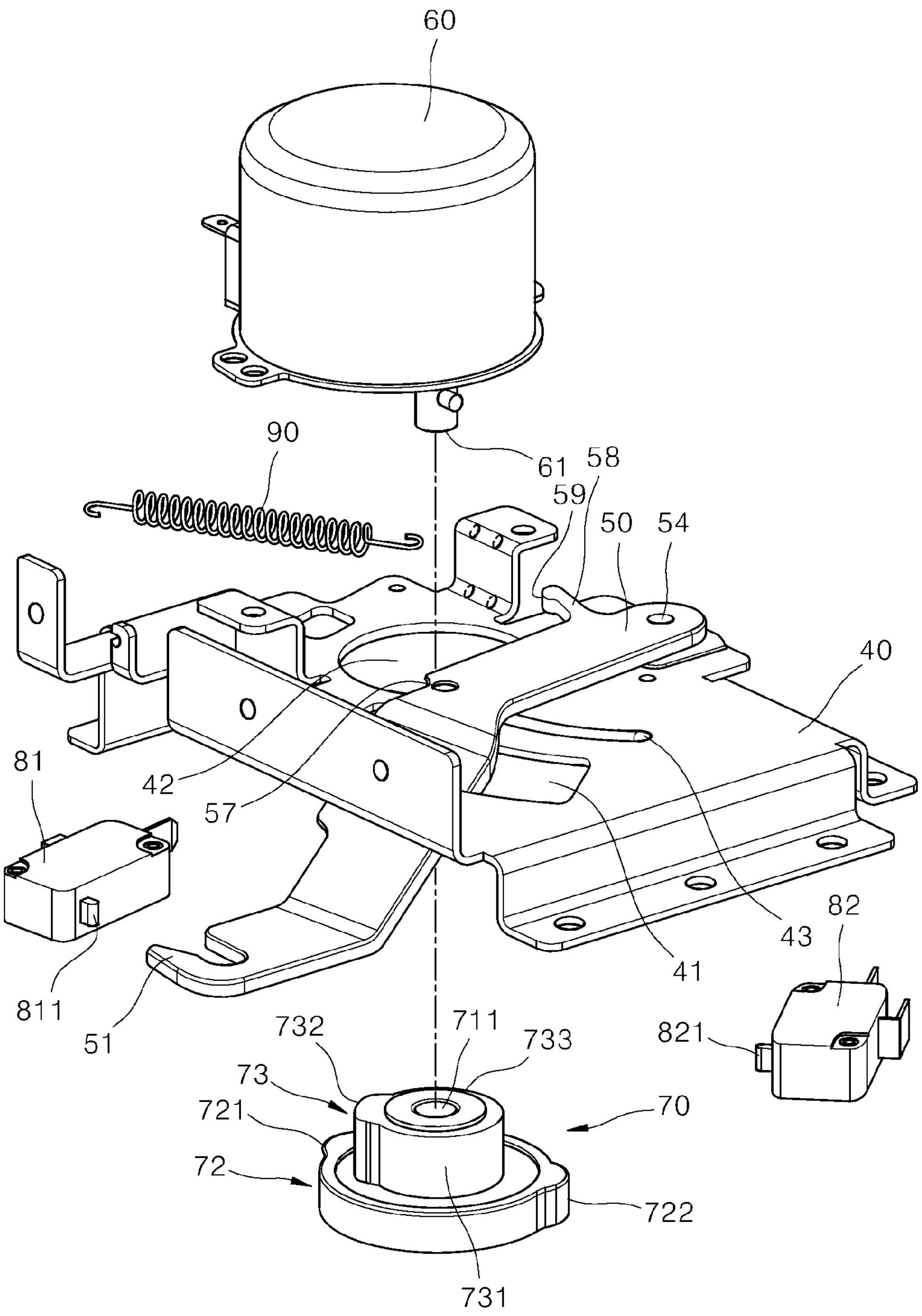
FIG. 5 is an exploded perspective view of the latch module of FIG. 4.
Figure 7:
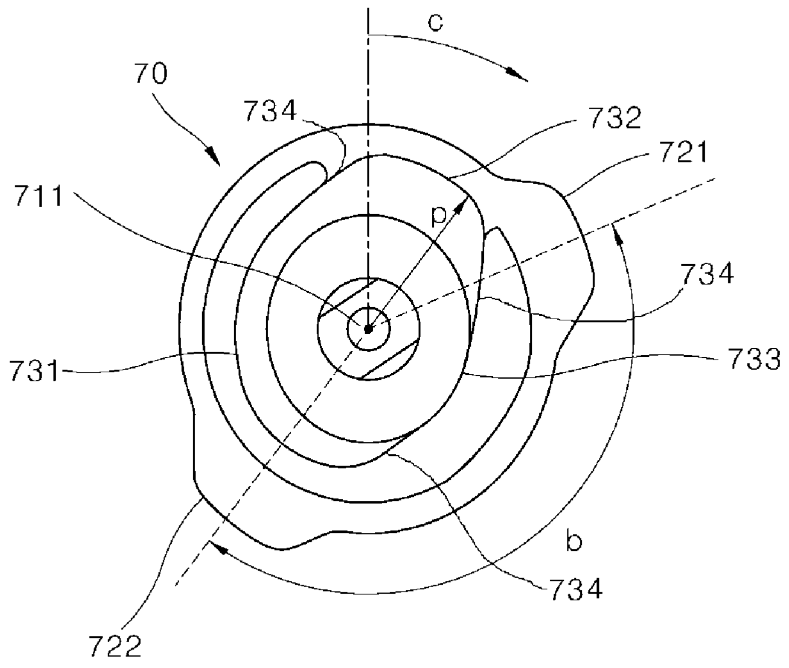
FIG. 7 is a plan view of a cam of the latch module of FIG. 4.
Figure 8:
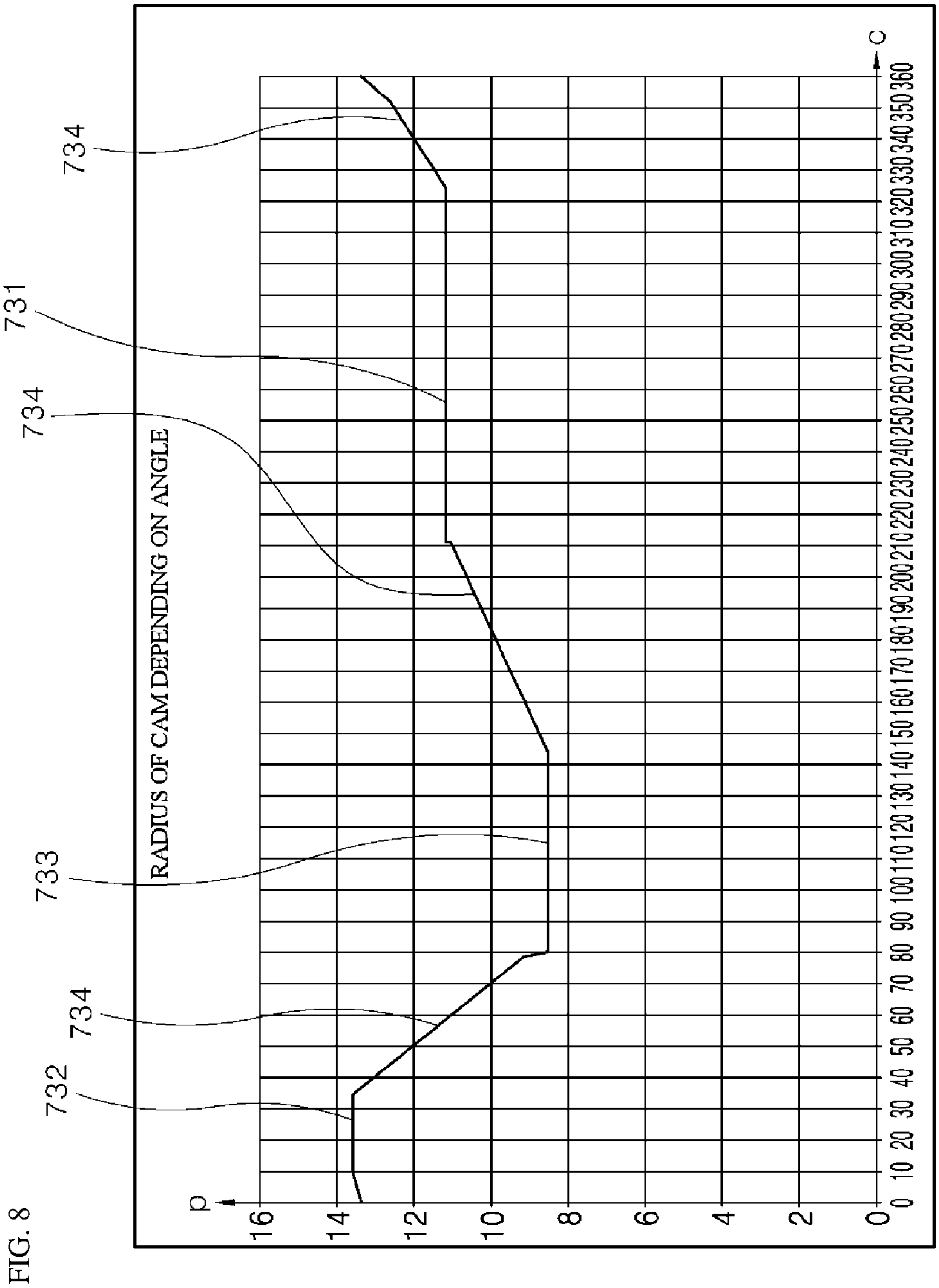
FIG. 8 is a graph of a radius of the cam depending on an angular position of the cam of FIG. 7.

Referring to FIGS. 5, 7, and 8, a cam according to an embodiment will be described. A latch position adjusting profile 73 of the cam 70 includes three surfaces having different radiuses from one another, that is, a contact surface for manual lock 731, a contact surface for automatic opening 732 and a contact surface for secure lock 733. The three surfaces have different radiuses from one another and are connected to each other by a connecting surface 734 that has a gradually increasing or reducing radius, respectively.

The contact surface for manual lock 731 includes a first radius. The first radius may be configured such that the latch 50 is disposed at a position where the door may be manually opened and closed in a state in which the first radius contacts the latch 50. In this state, the pin 22 of the door contacts the disengaging inclined surface 521 or the inclined insertion surface 53 of the hook 51. Accordingly, the spring 90 pulls the latch 50 in the first direction w1 and the contact surface for manual lock 731 of the cam 70 contacts the latch 50 (see FIG. 9(*a*), 9(*b*) or 12(*a*), 12(*b*)). In this state, when the user pulls the door in the opening direction thereof, the door may be opened. When the user closes the door, the door may be closed.

The contact surface for automatic opening 732 includes a second radius. The second radius is configured so that the latch 50 may be rotated in the second direction w2 to the position in which the latch 50 is released from the pin 22 of the door in a state in which the second radius contacts the latch 50. The second radius has a radius greater than the first radius. That is, when the spring 90 pulls the latch 50 in the first direction w1 and the contact surface for automatic opening 732 of the cam contacts the latch 50 (see FIG. 10(*a*), 10(*b*) or 11(*a*), 11(*b*)), the latch 50 is released from the pin 22 of the door.

The contact surface for secure lock 733 includes a third radius. The third radius is configured such that the latch 50 completely securely locks the door while being in contact with the latch 50 so that the door cannot be opened even when the door is pulled to open by the user. In this state, the pin 22 of the door contacts the secure lock surface 522 of the hook 51. Thus, when the spring 90 pulls the latch 50 in the first direction w1 and the contact surface for secure lock 733 of the cam 70 contacts the latch 50 (see FIGS. 13(*a*), 13(*b*)), even if the user pulls the door in the opening direction, the door may not open. That is, the state may be referred to as a completely locked state, for example, for self-cleaning.

A diameter rM1 of a cam surface in contact with the sub-contact surface 59 when the cam is in the first mode and the first radius of the cam contacts the contact surface of the latch (see FIG. 9(*b*)), a diameter rM2 of a cam surface that faces the sub-contact surface 59 when the cam is in the second mode and the second radius of the cam contacts the contact surface of the latch (see FIG. 10(*b*)), and a diameter rM3 of a cam surface that faces the sub-contact surface 59 when the cam is in the third mode and the third radius of the cam contacts the contact surface of the latch (see FIG. 13(*b*)) have a relation of $rM2 \le rM1 \le rM3$.

When the cam is in the first mode state, and the first radius 731 contacts the contact surface 55 of the latch 50, a portion of the cam surface that faces the sub-contact surface 59 may be the first radius 731, the third radius 733 or a connecting surface 734 connecting the first radius 731 and the third radius 733. According to the present disclosure, FIGS. 9(*b*) and 12(*b*) show that the cam surface that faces the sub-contact surface 59 is the first radius 731.

When the cam is in the second mode, and the second radius 732 is in a position in contact with the contact surface 55 of the latch 50, the cam surface that faces the sub-contact surface 59 may be the first radius 731 (see FIGS. 10(*b*) and 1(*b*)).

When the cam is in the third mode, and the third radius 733 is in the position in contact with the contact surface 55 of the latch 50, the cam surface in contact with the sub-contact surface 59 may be the second radius 732 (see FIG. 13(*b*)).

As shown in FIG. 9(*b*), when the cam 70 is in the first mode state, and the first radius 731 contacts the contact surface 55 of the latch 50, the radius rM1 of the cam surface that faces the sub-contact surface 59 is less than a distance dmp between a position mp of the sub-contact surface 59 and the center of rotation 711 of the cam 70 when the latch 50 is in the first basic position, and is equal to or less than the distance dop between the position op of the sub-contact surface 59 and the center of rotation 711 of the cam 70 when the latch 50 is in the second basic position (see FIG. 10(*b*)). That is, the relation of $rM1 \le dop < dmp$ is satisfied.

As shown in FIG. 10(*b*), when the cam 70 is in the second mode state, and the second radius 732 contacts the contact surface 55 of the latch 50, the radius rM2 of the cam surface that faces the sub-contact surface 59 is equal to or less than the distance dop between the position op of the sub-contact surface 59 and the center of rotation 711 of the cam 70 when the latch 50 is in the second basic position. That is, $rM2 \le dop$.

As shown in FIGS. 9(*b*) and 10(*b*), the relation of $rM1 \le rM2 \le dop < dmp$ may be expressed based on the conditions.

As shown in FIG. 13(*b*), when the cam is in the third mode state, and the third radius 733 of the cam 70 contacts the contact surface 55 of the latch 50, a radius rM3 of the cam surface that faces the sub-contact surface 59 is greater than a distance dmp between the position mp of the sub-contact surface 59 and the center or rotation 711 of the cam 70 with the latch 50 being in the first basic position and is equal to or less than a distance dlp between a position 1*p* of the sub-contact surface 59 and the center of rotation 711 of the cam 70 with the latch 50 is in the third basic position. That is, the relation of $dmp < rM3 \le dlp$ is satisfied.

All of the above conditions are expressed as follows:

$$rM1 \le rM2 \le dop < dmp < rM3 \le dlp.$$

On the other hand, a switch pressing profile 72 of the cam 70 has two pressing bosses having substantially the same radius. A first pressing boss 721 and a second pressing boss 722 are not arranged in a straight line, that is 180° opposite from each other, but are disposed at an obtuse angle. The angle of the two pressing bosses may correspond to an angle between the buttons 811 and 812 of the first switch and the second switch, and the radius of the two pressing bosses may be configured such that the pressing boss presses or press-releases the button as the cam rotates.

The first pressing boss may press the first switch or the second switch or not press the two switches depending on the rotational position of the cam. The second pressing boss may press the first switch or the second switch or not press both switches depending on the rotational direction of the cam.

Since the angle of the two pressing bosses corresponds to the angle of the buttons of the two switches, the state where the first pressing boss presses the first switch and the second pressing boss presses the second switch, that is, a first mode state where the two pressing bosses press the two switches, a second mode state where the second pressing boss presses the first switch and the first pressing boss does not press a switch, a third mode state where the first pressing boss presses the second switch and the second pressing boss does not press a switch, and a fourth mode state where the two pressing bosses do not press any switches may be implemented.

Each mode of the switch pressing profile 72 and the latch position adjusting profile 73 may be related to each other. That is, in the first mode, the contact surface for manual lock 731 may contact the latch to dispose the latch in the manual lock state. In the second mode, the contact surface for automatic opening 732 may contact the latch so that the latch is in the open position. In the third mode, the contact surface for secure lock 733 may contact the latch so that the latch is disposed in the secure lock position.

Hereinafter, an operation of a latch module according to an embodiment will be described with reference to FIGS. 9 to 13(*b*).

<Manual Lock State>

FIGS. 9(*a*) and 9(*b*) illustrate a manual lock state. A latch module is provided. That is, when the two pressing bosses 721 and 722 press the buttons 811 and 812 of the two switches, respectively, a contact surface for manual lock 731 which is a first radius of the latch position adjusting profile 73 contacts a contact surface 55 of a latch 50. The spring 90 pulls the latch 50 in the first direction w1 (a direction in which the hook 51 pivots leftward in FIG. 9(*a*)).

When the user pulls the door 20 in such a manual lock state, a rear surface of the pin 22 presses on the disengaging inclined surface 521 of the hook 51. The disengaging inclined surface 521 is inclined outward toward the first direction w1 so that the force is applied to the hook 50 in the second direction w2 by a force in which the pin 22 presses on the disengaging inclined surface 521, and accordingly, the latch 50 pivots in the second direction w2 with a force greater than the elastic force of the spring 90 (i.e., as the latch 50 pivots in the second direction w2, the contact surface 55 of the latch moves away from the contact surface for manual lock 731). As a result, the hook 51 that is engaged with the pin 22 is released so that the door is opened.

As described above, as the relation of $rM1 \leq dop < dmp$ is satisfied, the extension 58 does not interact with the cam during the pivot of the latch 50 in the second direction w2 for the manual opening of the door and the latch 50 may freely rotate in the second direction w2.

Figure 12B:
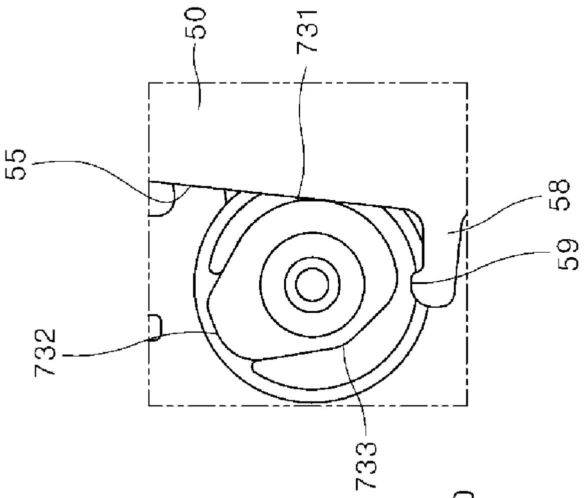
FIG. 12(*a*) is the bottom view of the cooking device, and FIG. 12(*b*) is the plan view of the cam and the part of the latch in contact with the cam, both representing a state where the latch module operates and the latch is in the manual lock position while the latch is disengaged from the pin of the door.
Figure 12A:
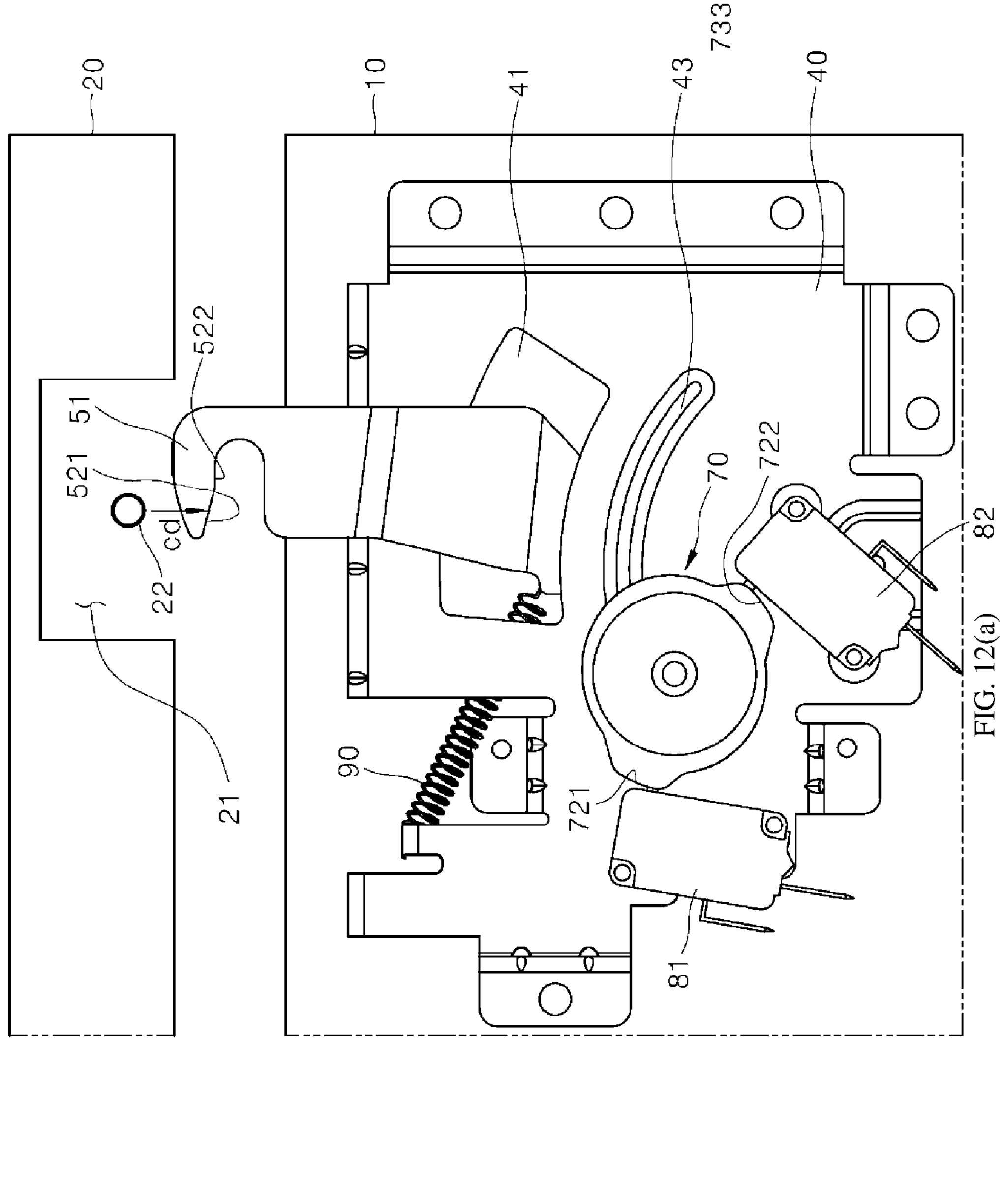

When the door is opened and the pin 22 is released from the hook 51, as a force in which the pin 22 pushes the hook 51 in the second direction disappears, the latch 50 pivots in the first direction w1 by means of the spring 90 until the contact surface 55 of the latch 50 contacts the contact surface for manual lock 731, so that the latch is returned to a manual lock position as shown in FIGS. 12(*a*) and 12(*b*).

In this state, when the user closes the door as shown in FIG. 12(*a*), the surface of the pin 22 pushes the inclined insertion surface 53 of the hook 51. As the inclined insertion surface 53 has a form inclined to a closing direction of the door toward the first direction w1, a force of pivoting in the second direction w2 is applied to the hook 51 in which the surface of the pin 22 presses against the inclined insertion surface 53 in the closing direction. Then, the latch 50 pivots in the second direction w2 with a force greater than the elastic force of the spring 90. As the door is closed, the force on the hook 51 is released from a locus of the moving pin 22. As shown in FIG. 9(*a*), when the door is closed, via the elastic force of the spring 90, the latch pivots again and returns in the first direction w2 by the elastic force of the spring until the contact surface 55 of the latch 50 contacts the contact surface for manual lock 731.

Similarly, as the relation of $rM1 \leq dop < dmp$ is satisfied, during the pivot of the latch 50 in the second direction w2 for manual closing the door, the extension 58 is not interfered with the cam 70 and the latch 50 may freely move in the second direction w2.

As described above, according to the embodiment, with the latch module 4, it is possible to open the door by manually pulling the door by the user, or close the door by pushing the door toward the main body.

<Automatic Opening Operation>

An Automatic opening operation of the latch module according to an embodiment will now be described. As shown in FIG. 9(*a*), when the user inputs an automatic opening command of a door through an input device, a bidirectional rotational motor 60 rotates in any one direction, that is, a first rotational direction by a controller 80, and the cam 70 is rotated in a first rotational direction c1. Then, a pressed state of the two switches is released, and the cam 70 continues to rotate. As shown in FIG. 10(*a*), the rotation of the cam 70 continues until a second pressing boss 722 presses a first switch 81. When the second pressing boss 722 presses the first switch 81, the bidirectional rotational motor 60 is stopped by the controller 80 that senses the pressed state, and the rotation of the cam in the first rotational direction c1 is also stopped. That is, the cam 70 is rotated in the first rotational direction c1 by an angle b of the two pressing bosses and stopped (see FIG. 7).

As shown in FIG. 10(*a*), as the first pressing boss 721 and the second pressing boss 722 are not on a straight line passing through a center of rotation 711 of the cam 70 and have an obtuse angle, the second pressing boss 722 presses the first switch 81 while the first pressing boss 721 does not press the second switch 82.

As the latch 50 is elastically supported by the spring in a direction in contact with the cam 70, the latch pivots while being in contact with the latch position adjusting profile 73 of the cam 70 depending on the radius of the latch position adjusting profile 73 during the rotation of the cam 70. As the cam 70 is rotated by the angle b in the first rotational direction c1, a position of the latch position adjusting profile 73 contacting the contact surface 55 of a latch 50 is moved from the contact surface for manual lock 731 to the contact surface for automatic opening 732 (as shown in FIG. 8, the position of the latch position adjusting profile 73 contacting the contact surface 55 of the latch 50 is moved from a vicinity of 250° (a contact surface for manual lock 731) to a vicinity of 20° (a contact surface for automatic opening 732) in a direction of increasing angle). As shown in FIGS. 10(*a*) and 10(*b*), as the radius of the cam 70 in contact with the latch 50 is increased from the first radius to the second radius, the cam 70 pushes the contact surface 55 of the latch 50 in a second direction w2 with a force greater than an elastic force of the spring 90. Accordingly, the hook that is locked with the pin 22 of the door is released.

As described above, the relation of rM1≤rM2≤dop<dmp is satisfied. Further, while the cam 70 is moved from a first mode to a second mode, a condition in which the radiuses rM1 and rM2 of a cam surface that faces the sub-contact surface 59 is less than distances dmp and dop between the sub-contact surface 59 and the center of rotation of the cam is continuously satisfied. Therefore, when the cam is rotated in the first rotational direction c1 for automatically opening the door and the latch is pivoted in the second direction w2, the cam 70 does not interact with the extension 58 and the latch 50 may freely rotate in the second direction w2.

When the door is closed, that is, when an opening angle thereof is 0°, according to an embodiment, the sub-spring 370 of the hinge module 300 applies the elastic force in the direction of opening the door. Therefore, as shown in FIG. 10(*a*), the door is moved in an opening direction od when the hook 51 is no longer locked with the pin 22 as the latch 50 is moved in the second direction w2 by the cam. As the sub-spring 370 of the hinge module 300 applies the elastic force in a direction of opening the door when the opening angle is 0°, an operation of opening the door instantly occurs when the lock of the hook 51 with respect to the pin is released.

For reference, the door would be opened at the position at which sum of the force transmitted from the sub-spring 370 of the hinge module to the hook 51 to move the latch 50 in the second direction w2 and the force of the drive 60 is greater than the applied force of moving the latch 50 in a first direction w1 by the elastic force of the spring 90, as the force of the drive 60 is transmitted to the latch 50 and the latch 50 moves in the second direction w2.

Accordingly, when the door is opened by an initial opening angle a1, the door may automatically opened by its own weight.

Figure 11B:
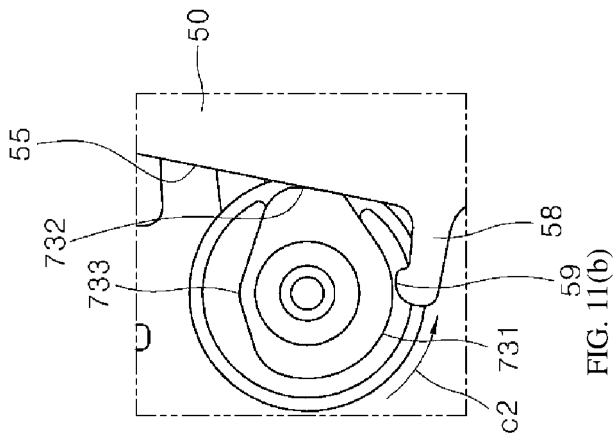
FIG. 11(*a*) is the bottom view of the cooking device, and FIG. 11(*b*) is the plan view of the cam and the part of the latch in contact with the cam, both representing a state where the latch is disengaged from the pin of the door and the door is opened to an initial open angle.
Figure 11A:
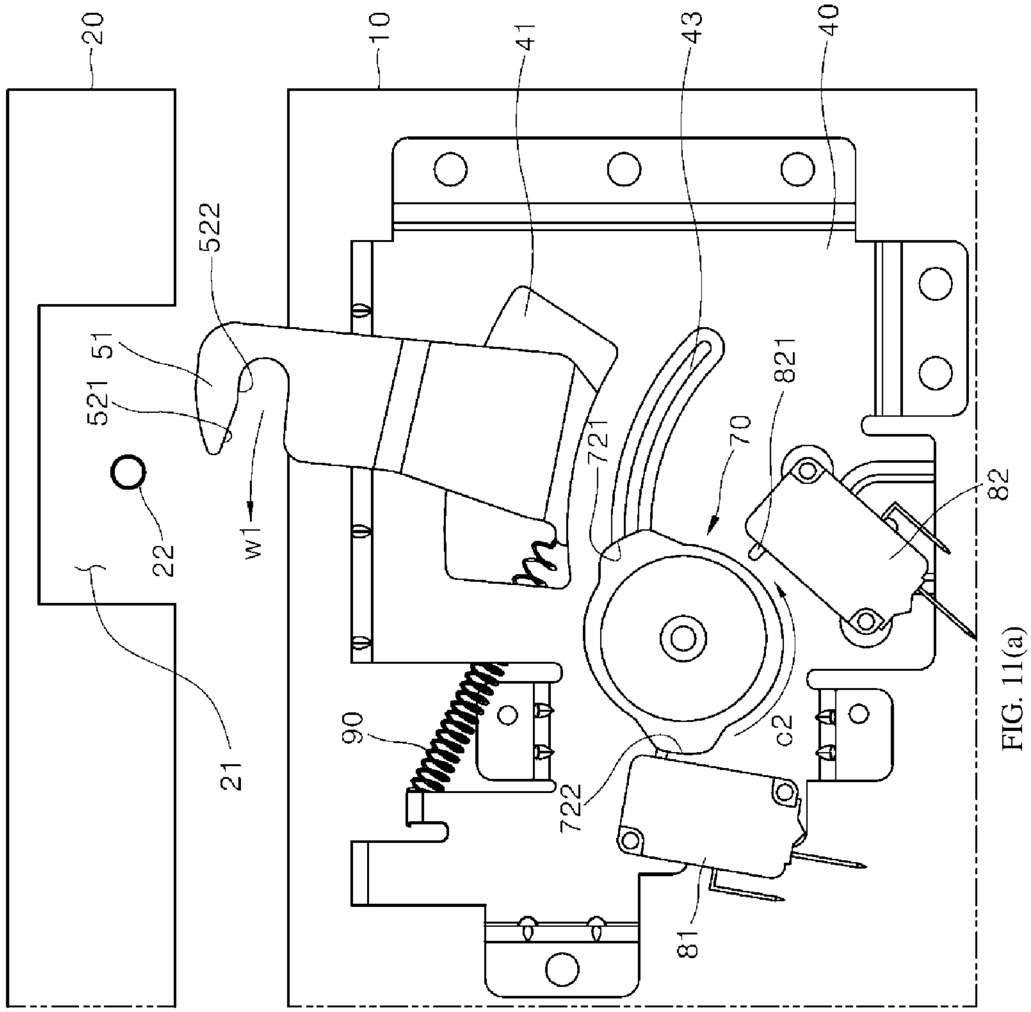

As shown in FIG. 11(*a*), as the bi-directional rotational motor 60 rotates in the other direction, that is, a second rotational direction c2, the cam rotates in a second rotational direction c2. Then, the pressing of the second pressing boss 722 with respect to the first switch 81 is released. As shown in FIG. 12(*a*), the rotation of the cam 70 in the second rotational direction c2 continues until the two pressing bosses 721 and 722 push the two switches 81 and 82, respectively. That is, the cam 70 is rotated in the second rotational direction c2 by the angle b of the two pressing bosses and then stopped (see FIG. 7).

As described above, the automatic opening operation may be performed continuously. That is, as shown in FIG. 9(*a*), when the command of automatically opening the door is inputted, as the cam 70 is rotated in the first rotational direction c1, the cam is moved to the position shown in FIGS. 10(*a*) and 11(*b*) by the angle b. Accordingly, the second pressing boss 722 presses the first switch 81, the cam 70 inversely rotates again in the second rotational direction c2 so that the cam 70 is returned to the state as shown in FIG. 9(*a*). As described above, the command of automatically opening the door enables rotating the cam 70 in the first mode by the angle b1 in the first rotational direction c1 and moving the cam 70 in the second mode, and immediately returning the cam to the first mode again. That is, in accordance with the command of automatically opening the door, the cam operates in the order of the first mode→the rotation in the first rotational direction (the fourth mode) →the second mode→the rotation in the second rotational direction (the fourth mode)→the first mode.

A secure lock operation according to an embodiment will now be described. As shown in FIG. 9(*a*) in a general state, when a user inputs a self-cleaning command through the input device, the controller 80 determines whether the door is closed through a door sensor 88. If the door is closed, the controller 80 controls the bidirectional rotational motor 60 to rotate in a second rotational direction so that a cam 70 rotates in a second rotational direction c2. The pressed state of the two switches are released and the cam 70 continues to rotate. As shown in FIG. 13(*a*), the rotation of the cam 70 continues until a first pressing boss 721 presses a second switch 82. When the first pressing boss 721 presses the second switch 82, the bidirectional rotational motor 60 is stopped by the controller 80, and accordingly, the rotation of the cam in the second rotational direction c2 is stopped. That is, the cam 70 is stopped after being rotated in the second rotational direction c2 by the angle b of the two pressing bosses.

As the first pressing boss and the second pressing boss are not on a straight line passing through the center of rotation of the cam 70 and have an obtuse angle, as shown in FIG. 13(*a*), the first pressing boss 721 presses the second switch 82 while the second pressing boss 722 does not press the first switch 81.

As the latch 50 has elastic force in the direction in contact with the cam 70 by the spring 90, while the cam 70 rotates, the latch 50 pivots depending on the contact of radius of the latch position adjusting profile 73 of the cam 70. As the cam rotates in the second rotational direction c2 by the angle b, the position of the latch position adjusting profile 73 contacting the contact surface 55 of the latch 50 is moved from the contact surface for manual lock 731 to the contact surface for secure lock 733 (as shown in FIG. 8, the radius of the cam is decreased from about 250° (contact surface for manual lock 731) to 110° (contact surface for secured lock 733)). Accordingly, the radius of the cam 70 that contacts the latch 50 is reduced from the first radius to the third radius, so that the spring 90 further pulls the latch 50 in the first direction w1 into the hook 51 as shown in FIG. 13(*a*). Accordingly, as the pin 22 of the door moves deeply into the hook 51, the rear surface of the pin 22 contacts the secure lock surface 522 of the hook 51. As the pin 22 of the door moves from the disengaging inclined surface 521 to the secure lock surface 522, the disengaging inclined surface 521 and the secure lock surface 522 may be connected via a smooth curved surface. When the spring 90 pulls the latch 50, the pin may be naturally moved smoothly from the disengaging inclined surface 521 to the secure lock surface 522.

The movement of the latch 50 in the first direction w1 is made by the elasticity of the spring 90. Therefore, if the pin 22 of the door is not completely moved inside the hook 51 and is stuck in a transitory position in the hook, or if the pivoting of the latch becomes stiff or is stuck due to foreign substances and the like, even if the cam 70 rotates in the second rotational direction c2 and moves from the first mode to the third mode, the latch 50 may not pivot correspondingly to reach the third basic position from the first basic position.

However, as described above, the relation of dop<dmp<rM3≤dlp is satisfied. That is, a point at which the cam 70 contacts the contact surface 55 of the latch 50 is moved from the first radius 731 to the third radius 733 as the cam 70 rotates, the radius of the surface of the cam 70 that faces the sub-contact surface 59 may exceed the distance dmp between the position mp of the sub-contact surface 59 and the center of rotation 711 of the cam 70 when the latch 50 is in the first basic position.

Therefore, even if the latch is engaged in the first basic position or between the first basic position and the second basic position, which is further away from the first basic position, while the cam 70 is rotated from the first mode to the third mode, the cam surface contacts the sub-contact surface 59 of the latch 50 and pushes the sub-contact surface 59 in the direction away from the cam, causing a kinematic interference such that the latch 50 is forcedly rotated in the first direction w1. Thus, the latch is surely moved to the third basic position.

As shown in FIG. 13(*a*), as the secure lock surface 522 is inclined in a closing direction toward the first direction w1, when the user pulls on the door, the hook receives more force to pivot in the first direction w1. Therefore, even if the user pulls on the door, the door may not be opened.

In particular, if the relation of rM3=dlp is satisfied, the latch 50 may surely reach the third basic position. When an external force is applied to the latch 50 disposed in the third basic position and the latch is pivoted in the second direction w2, as the cam 70 already contacts the sub-contact surface 59 of the latch 50, the pivoting of the latch 50 in the second direction w2 may be surely prevented via the kinematic interference.

In this state, a self-cleaning operation may proceed. The cavity is heated to 400° C. and maintained for a few minutes. An inner temperature of the cavity is measured by a temperature sensor 85. Even if the self-cleaning operation is completed, an internal temperature of the cavity is continuously monitored by the controller until the internal temperature falls.

When the internal temperature is lowered to a safe level, the controller 80 rotates the bidirectional rotational motor 60 in the first rotational direction c1 and rotates the cam 70 in the first rotational direction c1. Then, the pressing of the first pressing boss 721 with respect to the second switch 82 is released. As shown in FIG. 9(*a*), the rotation of the cam 70 in the first rotational direction c1 continues until the two pressing bosses 721 and 722 press the two switches 81 and 82, respectively. That is, the cam 70 is rotated in the first rotational direction c1 by the angle b of the two pressing and then stopped.

From the position shown in FIG. 9(*a*), when the self-cleaning command is inputted, the cam 70 is rotated by the angle b in the second rotational direction c2 to the position shown in FIG. 13(*a*), and the first pressing boss 721 presses the second switch 82, the rotation of the bidirectional rotational motor 60 and the cam 70 is stopped. Then, self-cleaning operation proceeds. After the self-cleaning operation is completed, the cam 70 rotates in the first rotational direction c1 and return to the state as shown in FIG. 9(*a*).

As described above, the self-cleaning command enables rotating the cam 70 in the first mode by the angle b in the second rotational direction c2. After the self-cleaning operation, the cam returns to the first mode again. That is, according to the self-cleaning command of the door, the cam is operated in the order of the first mode→the rotation in the second rotational direction (the fourth mode)→the third mode→the rotation in the first rotational direction (fourth mode)→the first mode.

As described above, according to the embodiment, both the manual lock state of the door, the automatic opening operation of the door, and the secure lock operation of the door may be implemented by one latch, one drive and one power transmitting portion.

Figure 14:
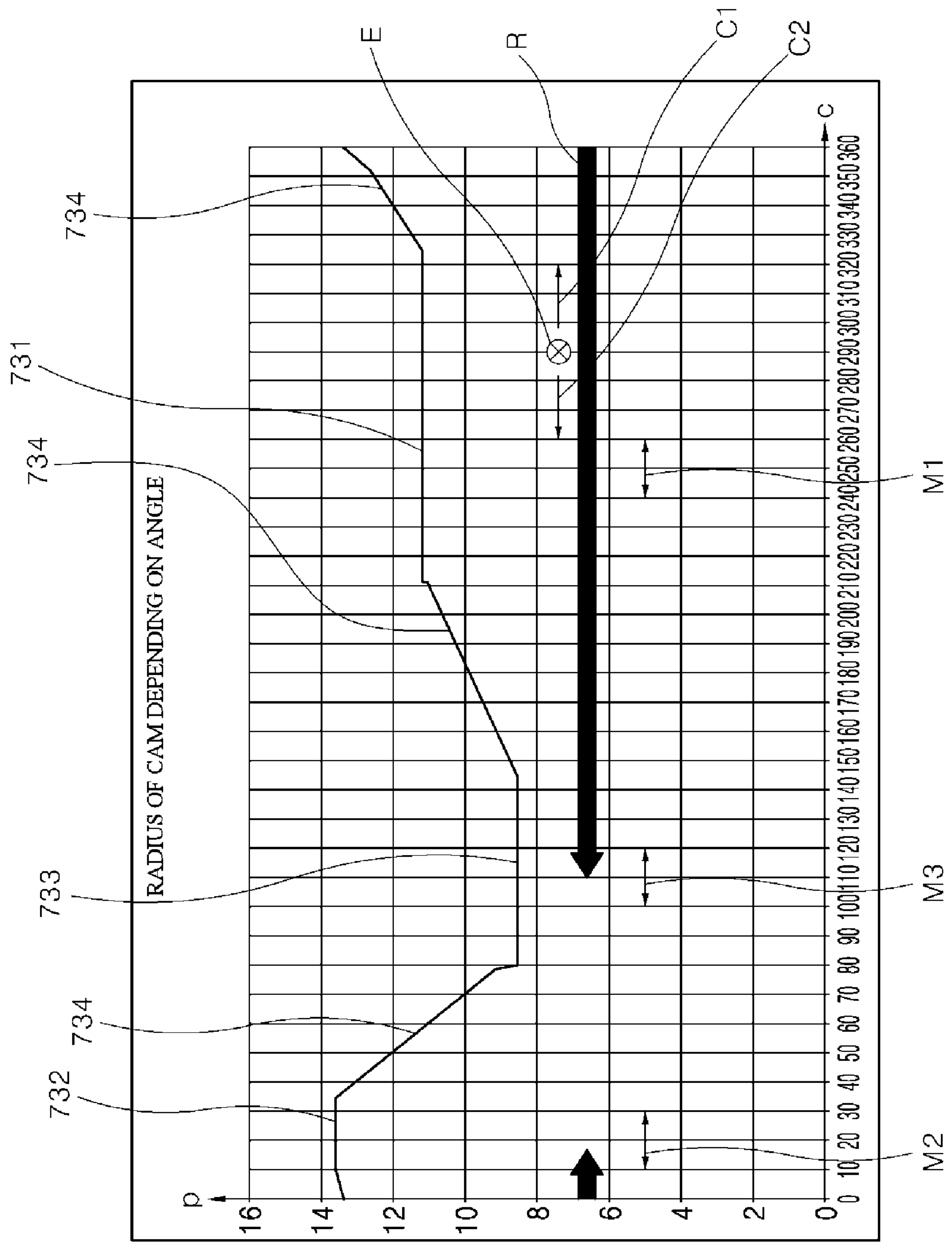
FIG. 14 is a graph showing a range of the cam in contact with a contact surface of the latch, a contact position of the cam in contact with the contact surface of the latch, a movement of the contact position of the cam in contact with the contact surface of the latch, and a position in which the cam presses a switch together, in addition to FIG. 8.

Referring to FIG. 14, an initial position search control of latch module will be described. The latch is in three basic positions such as the manual lock position, the automatic opening position, and the secure lock position, depending on whether the contact surface 55 of a latch 50 contacts any of the radiuses 731, 732, 733 of the latch position adjusting profile 73.

As described above, the rotational displacement of the cam 70 is controlled by the two switches 81 and 82 and the switch pressing profile 72 of the cam 70. The controller 80 determines a rotational direction and a rotation or non-rotation of a bidirectional rotational motor based on four modes of the two switches 81 and 82 (the first mode in which the two switches are pressed, the second mode in which the first switch is only pressed, the third mode in which the second switch is only pressed, and the fourth mode in which the two switches are not pressed) to control a rotational angle or a rotation or non-rotation of the cam.

As shown in FIG. 14, in a first mode M1 in which the switch pressing profile 72 presses the two switches, the manual lock state (the state of FIGS. 10(*a*) and 12(*a*)) in which the first radius 731 of the latch position adjusting profile 73 contacts the latch 10.

In this state, when the cam 70 rotates in the first rotational direction C1, the position of the latch position adjusting profile 73 in contact with the latch 50 is moved to the right side of the graph in FIG. 14. In this process, a first pressing boss 721 of the cam 70 is moved in an angle between the two switches shown in FIG. 15.

When the switch pressing profile 72 of the cam 70 is moved to a position corresponding to the second mode M2 in which the first switch is only pressed and then stopped, it can be confirmed that the cam 70 and the latch 50 are in the automatic opening state (the state of FIGS. 10(*a*) and 11(*a*), that is, the state in which the second radius 732 of the latch position adjusting profile 73 of the cam 70 contacts the latch 50. The cam 70 that has reached the second mode rotates again in the second rotational direction c2 and moves from the second mode M2 to the first mode M1.

When the cam rotates in the second rotational direction C2 in the first mode M1, the latch position adjusting profile 73 in contact with the latch 50 is moved to the left of the graph in FIG. 14. In this process, the a second pressing boss 722 of the cam 70 is moved between the angles of the two switches shown in FIG. 16.

When the switch pressing profile 72 of the cam 70 is moved to a position corresponding to a third mode M3 in which the second switch is only pressed and then stopped, it can be confirmed that the cam 70 and the latch 50 are in the secure lock state (the state of FIG. 13(*a*), that is, the state in which the third radius 733 of the latch position adjusting profile 73 of the cam 70 contacts the latch 50. After the self-cleaning operation, the cam 70 that has reached the third mode rotates again in the first rotational direction c1 and moves from the third mode M3 to the first mode M1.

As described above, the controller 80 determines the position of the cam 70 and controls the rotation of the cam 70 based on the state where at least one of the switches is pressed, that is, the first mode, the second mode and the third mode.

However, in situations such as where the cooking device is turned off due to a power failure, and the like and the cooking device is turned on again, the controller needs to determine whether the current position of the cam is in any one mode from the first mode to the fourth mode.

As a result of determination, if the cam is currently in any one mode of the first mode, the second mode and the third mode depending on the pressed state of the switch, the current position of the cam may be clearly determined. Therefore, it is possible to precisely control the state of the latch module (the manual lock, the automatic opening, and the secure lock) by controlling the drive and the cam.

However, as a result of the determination, if the cam is in the fourth mode state where none of the switches are pressed, it is not possible to clearly determine the current position of the cam. For example, referring to FIG. 14, all the remaining ranges except for the first mode M1, the second mode M2 and the third mode M3 shown are the fourth mode M4.

According to the embodiment, when a current state of the cam and the latch cannot be determined in the initial operation of the cooking device, the position is initialized, which may be a position search and an initial position setting operations.

When the cam is in the fourth mode, with respect to searching the position and setting the initial position, the initial position may be searched by rotating the cam in any one direction and determining an initially pressed switch. For example, when the cam and the latch are positioned where the cam in the fourth mode, the cam is rotated in any direction to reach any one of the first mode M1, the second mode M2 and the third mode M3.

However, according to the embodiment, as the latch module 4 is incorporated with an automatic opening function of the door, there is a problem that the door may be automatically opened when the controller 80 reaches the second mode M2 while searching for the initial position of the cam 70. That is, the cam should not reach the second mode M2 during the rotation of the cam while determining the initial position of the cam.

Thus, according to the embodiment, the switches 81 and 82 are arranged so that the buttons 811 and 812 have a predetermined angle b so that the buttons 811 and 812 are not arranged on a straight line on the center of rotation of the cam, and the cam has a switch pressing profile 72 having two pressing bosses 721 and 722 having an angle corresponding thereto, and the bidirectional rotational motor 60 is used as the drive 60.

The motor 60 is driven in the first rotational direction c1 to switch the cam 70 to the second mode M2 when the automatic opening function is performed based on the first mode M1 in the manual lock state, and the motor 60 is driven again in the second rotational direction c1 to be returned to the first mode M1.

Further, the motor 60 is driven in the second rotational direction c1 to switch the cam to the third mode M3 when the secure lock function is performed based on the first mode M1 in the manual locked state, and the motor 60 is driven again in the first rotational direction c2 to be returned to the first mode M1.

According to the above-described control method, the position of the latch position adjusting profile 73 in contact with the contact surface of the latch 50 is only within a contact range R of FIG. 14. Based on this principle, According to the embodiment, in an initial operation of the cooking device, assuming the position of the cam 70 is in the fourth mode in which the two switches are not pressed, the cam 70 is rotated in the second rotational direction c2 in order to determine the initial positions of the cam 70 and the latch 50.

When the cam 70 is in the fourth mode in the normal operation range R, the position of the cam 70 in contact with the latch 50 is between the third mode and the first mode of FIG. 14 (between about 120° and 240°), and between the first mode and the second mode (about 260° to 370° (10°)). Therefore, when the cam 70 is rotated in the second rotational direction c2, the cam 70 reaches the third mode or reaches the first mode, but does not reach the second mode. Therefore, when the cam 70 is rotated in the second rotational direction c2, the door does not in the initial position search step.

Figure 15:
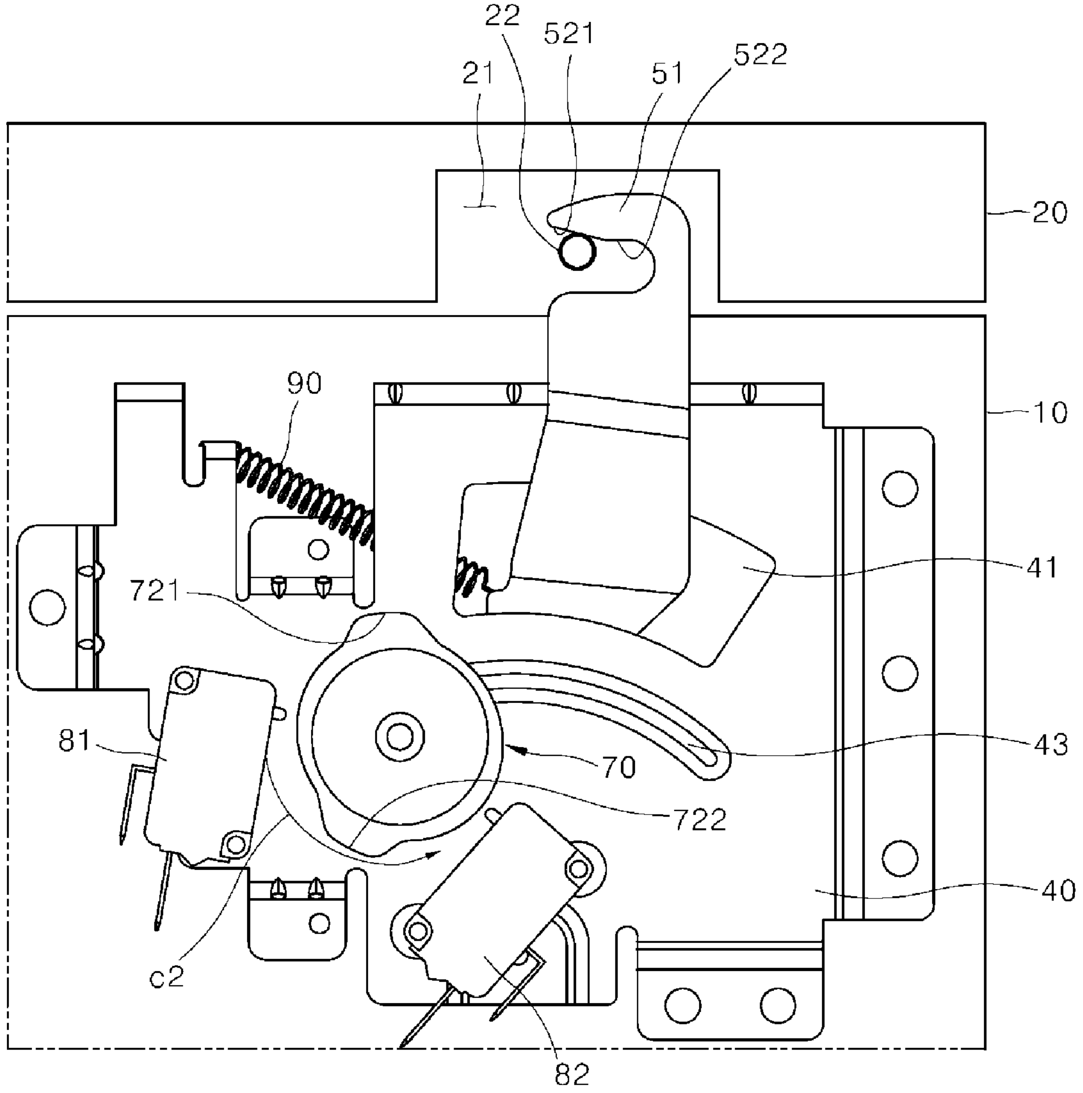
FIG. 15 shows a first case in which the cam is in a fourth mode.
Figure 16:
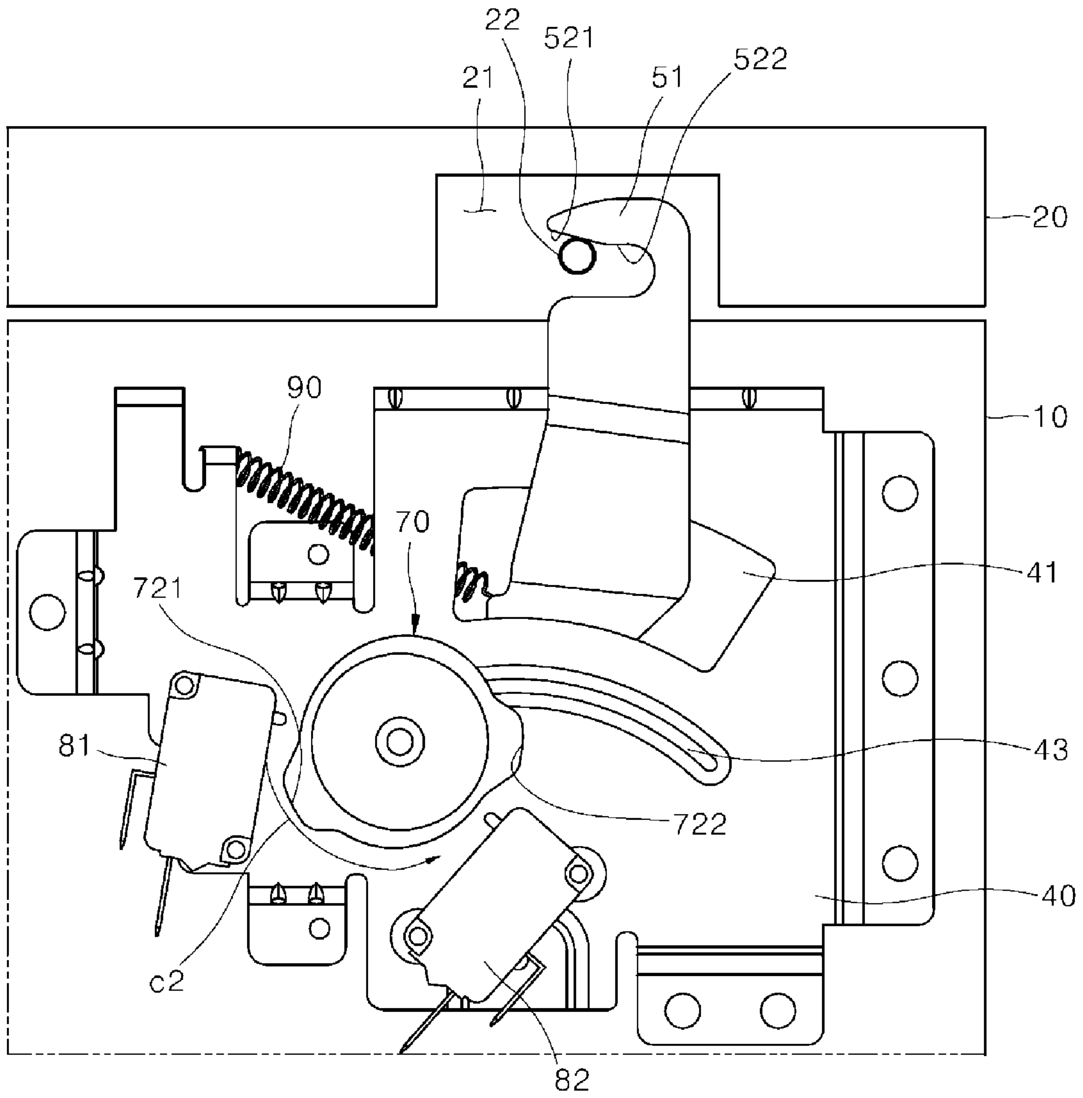
FIG. 16 shows a second case in which the cam is in the fourth mode.
Figure 17:
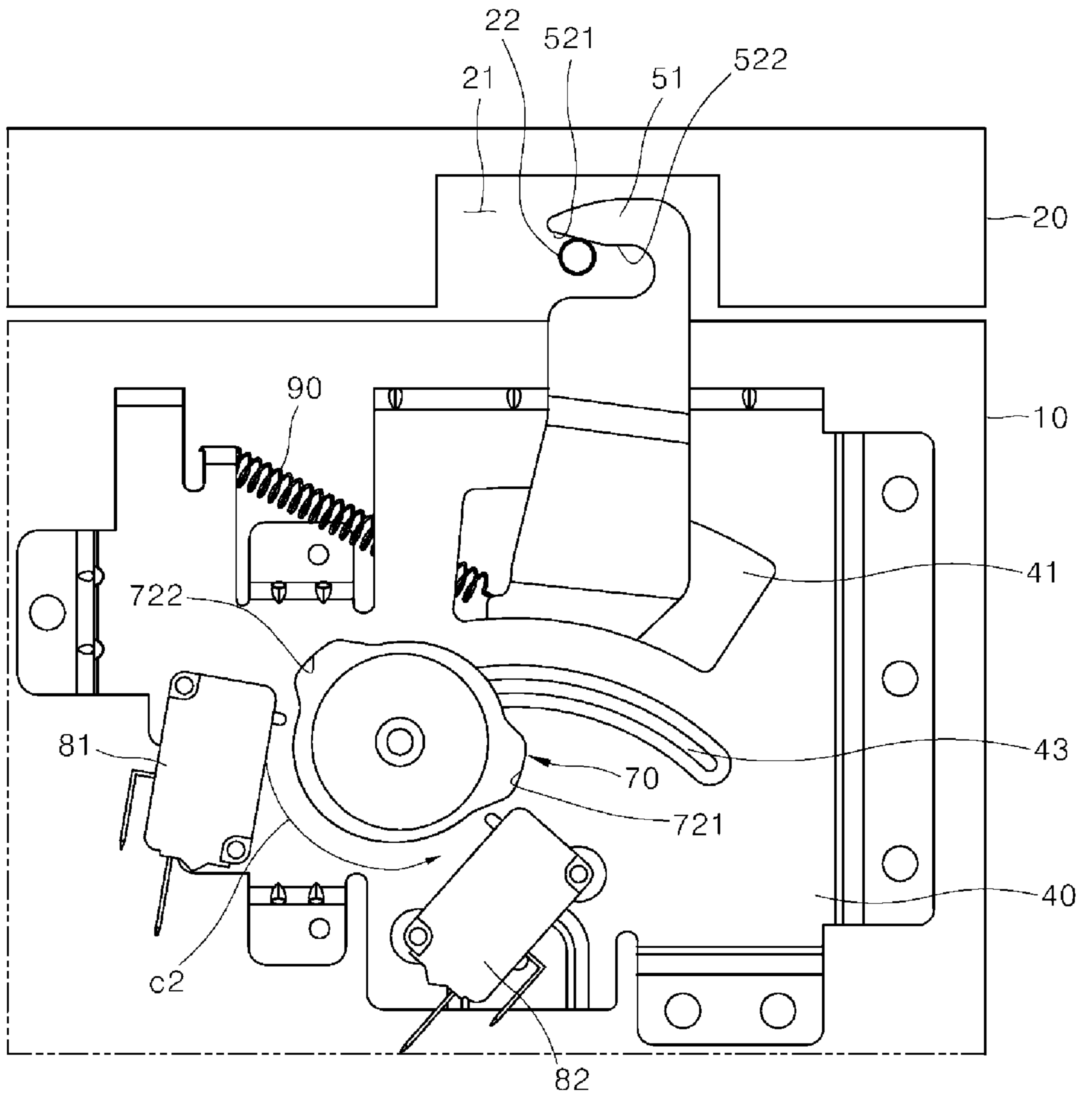
FIG. 17 shows a third case in which the cam is in the fourth mode.

Geometrically, a position range in which the cam 70 does not press both the switches are three cases, for example, a first case in which the second pressing boss 722 is within the angle of the two switches as shown in FIG. 15, a second case in which the first pressing boss 721 is within the angle of the two switches as shown in FIG. 16, and a third case in which the two pressing bosses 721 and 722 deviate from the angle of the two switches as shown in FIG. 17.

Among these cases, the state as shown in FIG. 15 may be between the second mode and the first mode (between about 260° to 370° (10°)) of FIG. 14. The state as shown in FIG. 16 may be the case where the cam is in the first mode and the third mode (about 120° to 240°).

Specifically, if the cam was initially in the position shown in FIG. 15, the cam reaches the first mode M1 after the cam is rotated in the second rotational direction c2 for searching the initial position of the cam. The controller 80 stops driving the motor 60 when the two switches 81, 82 are pressed. The cam 70 and the latch 50 are disposed in the manual locked state.

If the cam 70 is initially in the position shown in FIG. 16, the cam 70 reaches the third mode M3 after the cam is rotated in the second rotational direction c2 for searching the initial position of the cam. As the third mode is the secure lock position, the door is not automatically opened. When the second switch 82 is pressed and the first switch 81 is not pressed, the controller drives the motor 60 again in the opposite direction to rotate the cam in the first rotational direction c1. The cam reaches the first mode M1. The controller stops driving the motor 60 when both switches 81, 82 are pressed. The cam and latch may be in the manually locked position.

Figure 18:
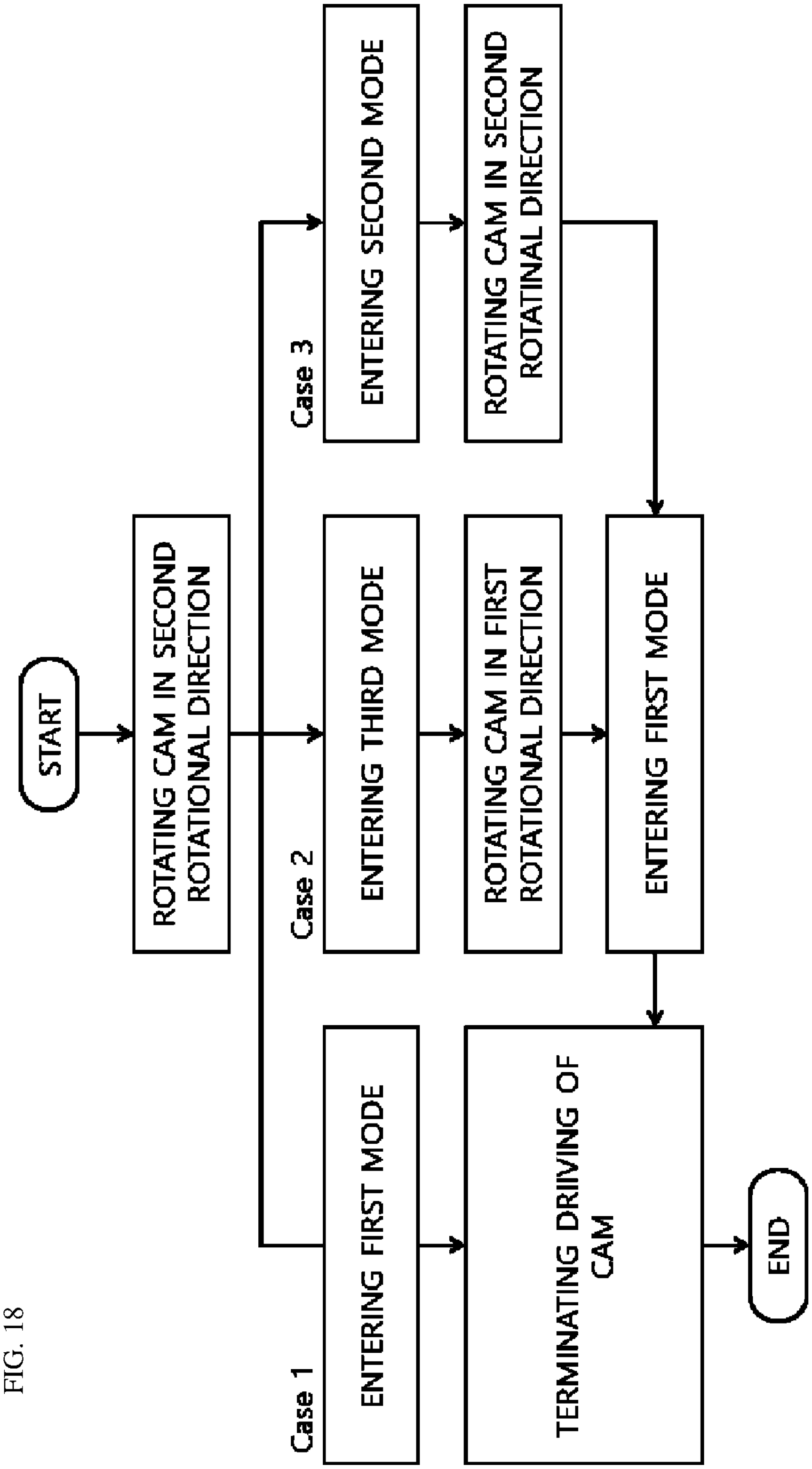
FIG. 18 is a schematic view of an algorithm for searching and setting an initial position of the cam.

That is, within a normal operating range R, case 1 and case 2 as shown in FIG. 18 are provided as an example of searching an initial position of the cam 70. Therefore, the door may not be automatically opened during search of the cam 70 with respect to the initial position.

However, it may not exclude that the position of the cam 70 is in the state shown in FIG. 17. For example, the initial position of the cam during manufacturing of the latch module 4 may be in the state as shown in FIG. 17. According to the embodiment, the controller 80 causes the cam 70 to rotate in the second rotational direction c2 when the cam is in the fourth mode during the initial driving of the cooking device. If the cam rotates in the second rotational direction c2 and reaches the second mode M2, that is, if the first switch 81 is only pressed and the second switch 82 is not pressed, the cam is further rotated in the second rotational direction c2 as shown in case 3 in FIG. 18. As a result, the cam enters the first mode M1. The controller stops the driving the motor 60 when both switches 81, 82 are pressed. The cam and latch may be in the manually locked position.

In such a state, the door may be opened. However, when the power is supplied to the latch module 4 before the latch module 4 is installed in the cooking device during the manufacturing of the product, the cam 70 and the latch 50 become the first mode M1 through the initial search step as described above. Further, during the manufacturing of the product, when the latch module 4 is installed in the cooking device and the power is supplied to the cooking device for inspection of the cooking device, the above-described initial search step is performed and the cam and the latch are in the first mode M1. Therefore, when the consumer purchases the cooking device and first uses the cooking device, the cam may not be in the state as shown in FIG. 17.

FIG. 19 is block diagram of an electronic system to implement an automatic opening structure and the control method as described above according to an embodiment of the invention. The electronic system includes, but not limited to, controller 80, the input device 100, such as a touch panel, the display 90, switches 81, 82, the temperature sensor 85, and the door sensor 88. The display 90 may display time, various operation status of the home appliance, and the like. The input device 100 may be used to input instructions pertaining to the operation of the cooking device and the like. The controller 80 receives various signals and instructions and controls the cooking device based on the received signals and instructions. For instance, the controller 80 may receive instructions from the input device 100. The controller 80 may receive signals from the switches 81, 82, the door sensor 88, and the temperature sensor 85. The controller 80 may control the motor 60 to drive the cam 70, which in turn interacts with the latch 50.

As described above, the controller 80 may control the position of the latch 50 by controlling the rotational displacement of the cam 70 through the switches 81 and 82 and the motor 60. In other words, the controller 80 may control such that the position of the latch 50 is at least one of the first basic position, the second basic position (the automatic opening position) and the third basic position (the secure lock position). Further, as described above, the control as shown in FIG. 18 may also be possible through the controller 80.

The controller may be a microprocessor, specific integrated circuits (ASICs), digital signal processors (DSPs), digital signal processing devices (DSPDs), programmable logic devices (PLDs), field programmable gate arrays (FPGAs), and the like.

While the present disclosure has been described with reference to exemplary embodiments thereof, it is to be understood that the disclosure is not limited to the disclosed embodiments and drawings, and it will be apparent that various modifications may be made by those skilled in the art within the range of the technical idea of the present disclosure. For example, in the embodiment of the present disclosure, a structure in which a cam is applied as a power transmitting portion is exemplified, but a power transmission structure that adjusts a basic position of the latch is implemented through a combination of various other kinematic structures such as a long hole, a hinge, and a link, and the like.

While the present disclosure does not explicitly describe the working effects based on the configuration of the present disclosure in the description of the embodiments of the present disclosure, it is to be noted that the expectable effects are acknowledged based on the configuration.

What is claimed is:

1. A latch module for controlling an opening and a closing of a door of an appliance, comprising:
- a latch configured to engage with or release from an engaging structure provided on the door;
- a cam that contacts a contact surface of the latch; and
- an extension having a sub-contact surface protruding from the extension in a direction of the cam,
- wherein a cam surface facing the sub-contact surface with a first radius of the cam that contacts the contact surface of the latch has a radius providing a space between the cam surface and the sub-contact surface that allows for the sub-contact surface to approach the cam surface when the latch is moved from the first basic position to the second basic position.

2. The latch module of claim 1,
- wherein the latch have positions comprising a first basic position, a second basic position, and a third basic position,
- wherein the first basic position is a position of the latch that engages with the engaging structure to maintain a closed state of the door and allows the door to be opened and closed manually,
- wherein the second basic position is a position of the latch that does not engage with the engaging structure,
- wherein the third basic position is a position of the latch that engages with the engaging structure to maintain a closed state of the door and the latch securely locks the door and does not allow the door to be opened manually.

3. The latch module of claim 2, wherein,
- the cam includes the first radius, a second radius, and a third radius in a circumferential direction at an outer circumference of the cam,
- the first radius of the cam interacts with the contact surface of the latch so that the latch is disposed in the first basic position,
- the second radius of the cam interacts with the contact surface of the latch so that the latch is disposed in the second basic position, and
- the third radius of the cam interacts with the contact surface of the latch so that the latch is disposed in the third basic position.

4. The latch module of claim 3, wherein,
- the second radius has a radius to pivot the latch in a first direction with respect to the first basic position so that the latch is disposed in the second basic position, and
- the third radius has a radius to pivot the latch in a second direction with respect to the first basic position so that the latch is disposed in the third basic position.

5. The latch module of claim 3, wherein,
- the first radius is in a range of 210° to 320° with respect to a reference line passing through a center of the cam and having 0°,
- the second radius is in a range of 10° to 30°, and
- the third radius is in a range of 80° to 140°.

6. The latch module of claim 3, wherein,
- a distance between the sub-contact surface and a center of rotation of the cam with the second radius of the cam that contacts the contact surface of the latch in the second basic position is equal to or greater than a radius of the cam surface that faces the sub-contact surface.

7. The latch module of claim 3, wherein,
- the cam surface that faces the sub-contact surface is the first radius, the third radius or a connecting surface that connects the first radius and the third radius when the first radius of the cam contacts the contact surface of the latch.

8. The latch module of claim 3, wherein,
- the sub-contact surface faces the first radius of the cam when the second radius of the cam contacts the contact surface of the latch.

9. The latch module of claim 3, wherein,
- the sub-contact surface does not interact with the surface of the cam while a contact between the cam and the contact surface of the latch transitions from the first radius to the second radius when the cam is rotated.

10. The latch module of claim 3, wherein, the cam surface that faces the sub-contact surface is the second radius when the third radius of the cam contacts the contact surface of the latch.

11. The latch module of claim 3, wherein, the radius of the cam surface that faces the sub-contact surface with the third radius of the cam in contact with the contact surface of the latch is greater than a distance between the sub-contact surface and a center of rotation of the cam when the latch is in the first basic position.

12. The latch module of claim 3, wherein, a radius of the cam surface that faces the sub-contact surface while a contact between the cam and the contact surface of the latch transitions from the first radius to the third radius when the cam rotates exceeds the distance between the sub-contact surface and a center of rotation of the cam when the latch is in the first basic position.

13. The latch module of claim 12, wherein, the radius of the cam surface in contact with the sub-contact surface with the third radius of the cam contacting the contact surface of the latch is the same as a distance between the sub-contact surface and the center of rotation of the cam forcing the latch to be in the third basic position.

14. The latch module of claim 2, wherein, in the second basic position, the latch is pivoted in a first direction with respect to the first basic position, and in the third basic position, the latch is pivoted in a second direction different from the first direction with respect to the first basic position.

15. The latch module of claim 2, further comprising:

an elastic body that applies a force to move the latch in a first direction, and a drive that provides power to move the latch in a second direction, wherein the cam transmits the power of the drive to the latch, the elastic body and the cam move the latch to the first basic position, the second basic position in which the latch is moved in the second direction from the first basic position, and the third basic position in which the latch is moved in the first direction from the first basic position.

16. An appliance comprising:

a main body including a cavity having an open front;

a pull-down door that opens and closes the open front of the cavity;

a pin;

a latch holder including;

a latch to engage the pin;

a cam that contacts a contact surface of the latch; and a sub-contact surface protruding from the extension in the direction of the cam, wherein a cam surface facing the sub-contact surface with a first radius of the cam that contacts the contact surface of the latch has a radius providing a space between the cam surface and the sub-contact surface that allows for the sub-contact surface to approach the cam surface when the latch is moved from the first basic position to the second basic position.

17. The appliance of claim 16, wherein, the cam includes the first radius, a second radius, and a third radius in a circumferential direction at an outer circumference of the cam, the first radius of the cam interacts with the contact surface of the latch so that the latch is disposed in the first basic position, the second radius of the cam interacts with the contact surface of the latch so that the latch is disposed in the second basic position, and the third radius of the cam interacts with the contact surface of the latch so that the latch is disposed in the third basic position.

18. The appliance of claim 17, wherein, the second radius is greater than the first radius, the third radius is less than the radius of the first radius, the cam is rotated from the first radius to the third radius in an automatic opening operation, and the cam is rotated from first radius to the second radius in a secure lock operation.

19. The appliance of claim 17, wherein the latch is pivoted by the rotation of the cam, wherein the latch have positions comprising a first basic position, a second basic position, and a third basic position, wherein the first basic position is a position of the latch in which the latch is engaged with the engaging structure to maintain a closed state of the door and allows the door to be opened and closed manually, wherein the second basic position is a position of the latch in which the latch is not engaged with the engaging structure, wherein the third basic position is a position of the latch in which the latch is engaged with the engaging structure to maintain a closed state of the door and the latch securely locks the door and does not allow the door to be opened manually.

20. The appliance of claim 19, wherein, the radius of the cam surface that faces the sub-contact surface with the third radius of the cam in contact with the contact surface of the latch is greater than a distance between the sub-contact surface and a center of rotation of the cam when the latch is in the first basic position.

* * * * *